US011881228B2

(12) United States Patent
Fuchs et al.

(10) Patent No.: US 11,881,228 B2
(45) **Date of Patent: *Jan. 23, 2024**

(54) CONCEPT FOR ENCODING AN AUDIO SIGNAL AND DECODING AN AUDIO SIGNAL USING SPEECH RELATED SPECTRAL SHAPING INFORMATION

(71) Applicant: Fraunhofer-Gesellschaft zur Foerderung der angewandten Forschung e.V., Munich (DE)

(72) Inventors: Guillaume Fuchs, Bubenreuth (DE); Markus Multrus, Nuremberg (DE); Emmanuel Ravelli, Erlangen (DE); Markus Schnell, Nuremberg (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 130 days.

This patent is subject to a terminal disclaimer.

(21) Appl. No.: 17/121,179

(22) Filed: Dec. 14, 2020

(65) Prior Publication Data

US 2021/0098010 A1 Apr. 1, 2021

Related U.S. Application Data

(63) Continuation of application No. 16/504,891, filed on Jul. 8, 2019, now Pat. No. 10,909,997, which is a (Continued)

(30) Foreign Application Priority Data

Oct. 18, 2013 (EP) .................................... 13189392
Jul. 28, 2014 (EP) .................................... 14178788

(51) Int. Cl.
*G10L 19/12* (2013.01)
*G10L 19/06* (2013.01)
(Continued)

(52) U.S. Cl.
CPC ............ *G10L 19/12* (2013.01); *G10L 19/032* (2013.01); *G10L 19/06* (2013.01); *G10L 19/07* (2013.01);
(Continued)

(58) Field of Classification Search
CPC ......... G10L 19/06; G10L 19/07; G10L 19/12; G10L 2019/0016
See application file for complete search history.

(56) References Cited

U.S. PATENT DOCUMENTS 5,444,816 A * 8/1995 Adoul ..................... G10L 19/12 704/262
5,528,727 A * 6/1996 Wang ...................... G10L 19/12 704/223
(Continued)

FOREIGN PATENT DOCUMENTS

AR 098072 A1 4/2016
CN 1188957 A 7/1998
(Continued)

OTHER PUBLICATIONS

"Frame Error Robust Narrow-Band and Wideband Embedded Variable Bit-Rate Coding of Speech and Audio from 8-32 kbit/s", ITU-T, G.718, Series G: Transmission System and Media, Digital Systems and Networks, Recommendation ITU-T G.718, Telecommunication Standardization Sector of ITU, Jun. 2008, 257 pages., Jun. 2008, pp. 1-257.
(Continued)

*Primary Examiner* — Samuel G Neway
(74) *Attorney, Agent, or Firm* — Perkins Coie LLP; Michael A. Glenn

(57) ABSTRACT

According to an aspect of the present invention an encoder for encoding an audio signal has an analyzer configured for deriving prediction coefficients and a residual signal from a
(Continued)

frame of the audio signal. The encoder has a formant information calculator configured for calculating a speech related spectral shaping information from the prediction coefficients, a gain parameter calculator configured for calculating a gain parameter from an unvoiced residual signal and the spectral shaping information and a bitstream former configured for forming an output signal based on an information related to a voiced signal frame, the gain parameter or a quantized gain parameter and the prediction coefficients.

15 Claims, 16 Drawing Sheets

Related U.S. Application Data continuation of application No. 15/131,681, filed on Apr. 18, 2016, now Pat. No. 10,373,625, which is a continuation of application No. PCT/EP2014/071767, filed on Oct. 10, 2014.

(51) Int. Cl.
*G10L 19/07* (2013.01)
*G10L 19/083* (2013.01)
*G10L 19/20* (2013.01)
*G10L 19/032* (2013.01)
*G10L 25/93* (2013.01)
*G10L 19/00* (2013.01)

(52) U.S. Cl.
CPC ............ *G10L 19/083* (2013.01); *G10L 19/20* (2013.01); *G10L 25/93* (2013.01); *G10L 2019/0016* (2013.01)

(56) References Cited

U.S. PATENT DOCUMENTS 5,732,389 A * 3/1998 Kroon ..................... G10L 25/93 704/214
5,864,797 A * 1/1999 Fujimoto .............. G10L 19/113 704/223
5,926,788 A 7/1999 Nishiguchi
5,946,651 A * 8/1999 Jarvinen ................. G10L 19/26 704/223
6,003,001 A * 12/1999 Maeda .................... G10L 19/12 704/223
6,067,511 A * 5/2000 Grabb ..................... G10L 19/02 704/E19.01
6,131,084 A * 10/2000 Hardwick ............. G10L 19/135 704/E19.038
6,192,335 B1 2/2001 Ekudden et al.
6,230,124 B1 * 5/2001 Maeda .................. H04L 1/0041 704/227
6,311,154 B1 10/2001 Gersho et al.
6,415,252 B1 7/2002 Peng et al.
6,611,800 B1 * 8/2003 Nishiguchi ......... G10L 19/0208 704/221
6,615,169 B1 * 9/2003 Ojala .................. G10L 21/0364 704/E21.009
7,778,827 B2 8/2010 Jelinek et al.
8,144,804 B2 3/2012 Chinen et al.
8,712,766 B2 * 4/2014 Ashley .................... G10L 19/12 704/229
10,304,470 B2 * 5/2019 Fuchs ..................... G10L 19/06
10,373,625 B2 * 8/2019 Fuchs ................... G10L 19/083
10,607,619 B2 * 3/2020 Fuchs ..................... G10L 19/06
10,909,997 B2 * 2/2021 Fuchs ................... G10L 19/032
2002/0091514 A1 7/2002 Fuchigami
2003/0074192 A1 * 4/2003 Choi ....................... G10L 25/90 704/219
2004/0148162 A1 7/2004 Fingscheidt et al.
2005/0010402 A1 * 1/2005 Sung ..................... G10L 19/125 704/E19.036
2006/0173677 A1 8/2006 Sato et al.
2006/0206317 A1 * 9/2006 Morii ...................... G10L 19/12 704/219
2009/0222273 A1 9/2009 Massaloux et al.
2010/0174538 A1 7/2010 Vos
2010/0262420 A1 10/2010 Herre et al.
2011/0200198 A1 8/2011 Grill et al.
2012/0209599 A1 8/2012 Malenovsky et al.
2016/0232908 A1 * 8/2016 Fuchs ..................... G10L 25/15
2016/0232909 A1 * 8/2016 Fuchs ................... G10L 19/032
2019/0228787 A1 * 7/2019 Fuchs ..................... G10L 19/20
2019/0333529 A1 * 10/2019 Fuchs ................... G10L 19/032
2020/0219521 A1 * 7/2020 Fuchs ..................... G10L 19/08
2021/0098010 A1 * 4/2021 Fuchs ..................... G10L 19/07

FOREIGN PATENT DOCUMENTS

CN 1272939 A 11/2000
CN 1328683 A 12/2001
CN 1338096 A 2/2002
CN 1440126 A 9/2003
CN 1795495 A 6/2006
CN 101401153 A 4/2009
CN 102124517 A 7/2011
CN 102341848 A 2/2012
EP 967594 A1 12/1999
JP H06202697 A 7/1994
JP 2001051699 A 2/2001
JP 2010055002 A 3/2010
JP 2011518345 A 6/2011
JP 5686369 B2 1/2015
JP 2015515644 A 5/2015
KR 1020010033539 A 4/2001
RU 2223555 C2 2/2004
RU 2255380 C2 6/2005
RU 2316059 C2 1/2008
RU 2008146294 A 5/2010
RU 2400832 C2 9/2010
RU 2012130472 A 9/2013
WO 0025305 A1 5/2000
WO 2013127364 A1 9/2013

OTHER PUBLICATIONS

Gerson, I. A. , et al., "Vector Sum Excited Linear Prediction (VSELP)", Advances in Speech Coding. Vancouver, Sep. 5-8, 1989 [Proceedings of the Workshop on Speech Coding for Telecommunications], Boston, Kluwer, US, pp. 69-79.
Jelinek, Milan , et al., "Wideband Speech Coding Advances in VMR-WB Standard", IEEE Transactions on Audio, Speech, and Language Processing, vol. 15, No. 4, pp. 1167-1179.
Moreau, N , et al., "Successive Orthogonalizations in the Multistage CELP Coder", Speech Processing 1, San Francisco, Mar. 23-26, 1992 [Proceedings of the International Conference on Acoustics, Speech, an Signal Processing (ICASSP)] New York, IEEE, US, vol. 1, pp. 61-64.
Quackenbush , "A 7 kHz bandwidth, 32 kbps speech coder for ISDN", 1991 International Conference on Acoustics, Speech, and Signal Processing. (Abstract), Apr. 1991, pp. 1-4.
Taddei , et al., "Efficient coding of transitional speech segments in celp", Speech Coding, 2002, IEEE Workshop Proceedings. Oct. 6-9, 2002, Piscataway, NJ, USA, IEEE, Oct. 6, 2002 (Oct. 6, 2002), pp. 14-16, XP010647197, Oct. 6, 2002.
Taumi, S. , et al., "13kbps Low-Delay Error- Robust Speech Coding for GSM EFR", Speech Coding for Telecommunications, 1995. Proceedings., 1995 IEEE Workshop, pp. 61-62.
Thyssen, J. , et al., "A Candidate for the ITU-T 4 kbit/s Speech Coding Standard", 2001 IEEE International Conference on Acoustics, Speech, and Signal Processing. Proceedings. (ICASSP)Salt Lake City, Utah May 7-11, 2001, pp. 681-684.
Zhang, L. , et al., "A ELP Variable Rate Speech Codec With Low Avarage Rate", 1997 IEEE International Conference on Acoustic, Speech, & Signal Processing. Speech Processing. Speech Process-

(56) References Cited

OTHER PUBLICATIONS ing. Munich, Apr. 21-24, 1997; Los Alamitos, IEEE Corp. Soc. Press,, Apr. 21, 1997, pp. 735-738, XP000822552.

* cited by examiner

CONCEPT FOR ENCODING AN AUDIO SIGNAL AND DECODING AN AUDIO SIGNAL USING SPEECH RELATED SPECTRAL SHAPING INFORMATION

CROSS-REFERENCE TO RELATED APPLICATIONS

This application is a continuation of U.S. application Ser. No. 16/504,891, filed Jul. 8, 2019, which is a continuation of U.S. patent application Ser. No. 15/131,681, filed Apr. 18, 2016, now issued as U.S. Pat. No. 10,373,625, which is a continuation of copending International Application No. PCT/EP2014/071767, filed Oct. 10, 2014, which is incorporated herein by reference in its entirety, and additionally claims priority from European Application No. 13189392.7, filed Oct. 18, 2013, and from European Application No. 14178788.7, filed Jul. 28, 2014, which are also incorporated herein by reference in their entirety.

BACKGROUND OF THE INVENTION

The present invention relates to encoders for encoding an audio signal, in particular a speech related audio signal. The present invention also relates to decoders and methods for decoding an encoded audio signal. The present invention further relates to encoded audio signals and to an advanced speech unvoiced coding at low bitrates.

At low bitrate, speech coding can benefit from a special handling for the unvoiced frames in order to maintain the speech quality while reducing the bitrate. Unvoiced frames can be perceptually modeled as a random excitation which is shaped both in frequency and time domain. As the waveform and the excitation looks and sounds almost the same as a Gaussian white noise, its waveform coding can be relaxed and replaced by a synthetically generated white noise. The coding will then consist of coding the time and frequency domain shapes of the signal.

FIG. 16 shows a schematic block diagram of a parametric unvoiced coding scheme. A synthesis filter 1202 is configured for modeling the vocal tract and is parameterized by LPC (Linear Predictive Coding) parameters. From the derived LPC filter comprising a filter function A(z) a perceptual weighted filter can be derived by weighting the LPC coefficients. The perceptual filter fw(n) has usually a transfer function of the form:

$$Ffw(z) = \frac{A(z)}{A(z/w)}$$

wherein w is lower than 1. The gain parameter $g_n$ is computed for getting a synthesized energy matching the original energy in the perceptual domain according to:

$$g_n = \sqrt{\frac{\sum_{n=0}^{Ls} sw^2(n)}{\sum_{n=0}^{Ls} nw^2(n)}}$$

where sw(n) and nw(n) are the input signal and generated noise, respectively, filtered by the perceptual filter fw(n). The gain $g_n$ is computed for each subframe of size Ls. For example, an audio signal may be divided into frames with a length of 20 ms. Each frame may be subdivided into subframes, for example, into four subframes, each comprising a length of 5 ms.

Code excited linear prediction (CELP) coding scheme is widely used in speech communications and is a very efficient way of coding speech. It gives a more natural speech quality than parametric coding but it also requests higher rates. CELP synthesizes an audio signal by conveying to a Linear Predictive filter, called LPC synthesis filter which may comprise a form 1/A(z), the sum of two excitations. One excitation is coming from the decoded past, which is called the adaptive codebook. The other contribution is coming from an innovative codebook populated by fixed codes. However, at low bitrates the innovative codebook is not enough populated for modeling efficiently the fine structure of the speech or the noise-like excitation of the unvoiced. Therefore, the perceptual quality is degraded, especially the unvoiced frames which sounds then crispy and unnatural.

For mitigating the coding artifacts at low bitrates, different solutions were already proposed. In G.718[1] and in [2] the codes of the innovative codebook are adaptively and spectrally shaped by enhancing the spectral regions corresponding to the formants of the current frame. The formant positions and shapes can be deducted directly from the LPC coefficients, coefficients already available at both encoder and decoder sides. The formant enhancement of codes c(n) are done by a simple filtering according to:

$$c(n)*fe(n)$$

wherein * denotes the convolution operator and wherein fe(n) is the impulse response of the filter of transfer function:

$$Ffe(z) = \frac{A(z/w1)}{A(z/w2)}$$

Where w1 and w2 are the two weighting constants emphasizing more or less the formantic structure of the transfer function Ffe(z). The resulting shaped codes inherit a characteristic of the speech signal and the synthesized signal sounds cleaner.

In CELP it is also usual to add a spectral tilt to the decoder of the innovative codebook. It is done by filtering the codes with the following filter:

$$Ft(z)=1-\beta z^{-1}$$

The factor β is usually related to the voicing of the previous frame and depends, i.e., it varies. The voicing can be estimated from the energy contribution from the adaptive codebook. If the previous frame is voiced, it is expected that the current frame will also be voiced and that the codes should have more energy in the low frequencies, i.e., should show a negative tilt. On the contrary, the added spectral tilt will be positive for unvoiced frames and more energy will be distributed towards high frequencies.

The use of spectral shaping for speech enhancement and noise reduction of the output of the decoder is a usual practice. A so-called formant enhancement as post-filtering consists of an adaptive post-filtering for which the coefficients are derived from the LPC parameters of the decoder. The post-filter looks similar to the one (fe(n)) used for shaping the innovative excitation in certain CELP coders as discussed above. However, in that case, the post-filtering is only applied at the end of the decoder process and not at the encoder side.

In conventional CELP (CELP=(Code)-book excited Linear Prediction), the frequency shape is modeled by the LP (Linear Prediction) synthesis filter, while the time domain shape can be approximated by the excitation gain sent to every subframe although the Long-Term Prediction (LTP) and the innovative codebook are usually not suited for modeling the noise-like excitation of the unvoiced frames. CELP needs a relatively high bitrate for reaching a good quality of the speech unvoiced.

A voiced or unvoiced characterization may be related to segment speech into portions and associated each of them to a different source model of speech. The source models as they are used in CELP speech coding scheme rely on an adaptive harmonic excitation simulating the air flow coming out the glottis and a resonant filter modeling the vocal tract excited by the produced air flow. Such models may provide good results for phonemes like vocals, but may result in incorrect modeling for speech portions that are not generated by the glottis, in particular when the vocal chords are not vibrating such as unvoiced phonemes “s” or “f”.

On the other hand, parametric speech coders are also called vocoders and adopt a single source model for unvoiced frames. It can reach very low bitrates while achieving a so-called synthetic quality being not as natural as the quality delivered by CELP coding schemes at much higher rates.

Thus, there is a need for enhancing audio signals.

An object of the present invention is to increase sound quality at low bitrates and/or reducing bitrates for good sound quality.

SUMMARY

According to an embodiment, an encoder for encoding an audio signal may have: an analyzer configured for deriving prediction coefficients and a residual signal from a frame of the audio signal; a formant information calculator configured for calculating a speech related spectral shaping information from the prediction coefficients; a gain parameter calculator configured for calculating a gain parameter from an unvoiced residual signal and the spectral shaping information; and a bitstream former configured for forming an output signal based on an information related to a voiced signal frame, the gain parameter or a quantized gain parameter and the prediction coefficients.

According to another embodiment, a decoder for decoding a received signal having information related to prediction coefficients may have: a formant information calculator configured for calculating a speech related spectral shaping information from the prediction coefficients; a noise generator configured for generating a decoding noise-like signal; a shaper configured for shaping a spectrum of the decoding noise-like signal or an amplified representation thereof using the spectral shaping information to obtain a shaped decoding noise-like signal; and a synthesizer configured for synthesizing a synthesized signal from the amplified shaped encoding noise-like signal and the prediction coefficients.

Another embodiment may have an encoded audio signal having prediction coefficient information for a voiced frame and an unvoiced frame, a further information related to the voiced signal frame and an information related to a gain parameter or a quantized gain parameter for the unvoiced frame.

According to another embodiment, a method for encoding an audio signal may have the steps of: deriving prediction coefficients and a residual signal from an audio signal frame; calculating a speech related spectral shaping information from the prediction coefficients; calculating a gain parameter from an unvoiced residual signal and the spectral shaping information; and forming an output signal based on an information related to a voiced signal frame, the gain parameter or a quantized gain parameter and the prediction coefficients.

According to another embodiment, a method for decoding a received audio signal having an information related prediction coefficients and a gain parameter may have the steps of: calculating a speech related spectral shaping information from the prediction coefficients; generating a decoding noise-like signal; shaping a spectrum of the decoding noise-like signal or an amplified representation thereof using the spectral shaping information to obtain a shaped decoding noise-like signal; and synthesizing a synthesized signal from the amplified shaped encoding noise-like signal and the prediction coefficients.

Another embodiment may have a non-transitory digital storage medium having stored thereon a computer program for performing a method for encoding an audio signal, the method having the steps of: deriving prediction coefficients and a residual signal from an audio signal frame; calculating a speech related spectral shaping information from the prediction coefficients; calculating a gain parameter from an unvoiced residual signal and the spectral shaping information; and forming an output signal based on an information related to a voiced signal frame, the gain parameter or a quantized gain parameter and the prediction coefficients, when said computer program is run by a computer.

Another embodiment may have a non-transitory digital storage medium having stored thereon a computer program for performing a method for decoding a received audio signal having an information related prediction coefficients and a gain parameter, the method having the steps of: calculating a speech related spectral shaping information from the prediction coefficients; generating a decoding noise-like signal; shaping a spectrum of the decoding noise-like signal or an amplified representation thereof using the spectral shaping information to acquire a shaped decoding noise-like signal; and synthesizing a synthesized signal from the amplified shaped encoding noise-like signal and the prediction coefficients, when said computer program is run by a computer.

The inventors found out that in a first aspect a quality of a decoded audio signal related to an unvoiced frame of the audio signal, may be increased, i.e., enhanced, by determining a speech related shaping information such that a gain parameter information for amplification of signals may be derived from the speech related shaping information. Furthermore a speech related shaping information may be used for spectrally shaping a decoded signal. Frequency regions comprising a higher importance for speech, e.g., low frequencies below 4 kHz, may thus be processed such that they comprise less errors.

The inventors further found out that in a second aspect by generating a first excitation signal from a deterministic codebook for a frame or subframe (portion) of a synthesized signal and by generating a second excitation signal from a noise-like signal for the frame or subframe of the synthesized signal and by combining the first excitation signal and the second excitation signal for generating a combined excitation signal a sound quality of the synthesized signal may be increased, i.e., enhanced. Especially for portions of an audio signal comprising a speech signal with background noise, the sound quality may be improved by adding noise-like signals. A gain parameter for optionally amplifying the first excitation signal may be determined at the encoder and an information related thereto may be transmitted with the encoded audio signal.

Alternatively or in addition, the enhancement of the audio signal synthesized may be at least partially exploited for reducing bitrates for encoding the audio signal.

An encoder according to the first aspect comprises an analyzer configured for deriving prediction coefficients and a residual signal from a frame of the audio signal. The encoder further comprises a formant information calculator configured for calculating a speech related spectral shaping information from the prediction coefficients. The encoder further comprises a gain parameter calculator configured for calculating a gain parameter from an unvoiced residual signal and the spectral shaping information and a bitstream former configured for forming an output signal based on an information related to a voiced signal frame, the gain parameter or a quantized gain parameter and the prediction coefficients.

Further embodiments of the first aspect provide an encoded audio signal comprising a prediction coefficient information for a voiced frame and an unvoiced frame of the audio signal, a further information related to the voiced signal frame and a gain parameter or a quantized gain parameter for the unvoiced frame. This allows for efficiently transmitting speech related information to enable a decoding of the encoded audio signal to obtain a synthesized (restored) signal with a high audio quality.

Further embodiments of the first aspect provide a decoder for decoding a received signal comprising prediction coefficients. The decoder comprises a formant information calculator, a noise generator, a shaper and a synthesizer. The formant information calculator is configured for calculating a speech related spectral shaping information from the prediction coefficients. The noise generator is configured for generating a decoding noise-like signal. The shaper is configured for shaping a spectrum of the decoding noise-like signal or an amplified representation thereof using the spectral shaping information to obtain a shaped decoding noise-like signal. The synthesizer is configured for synthesizing a synthesized signal from the amplified shaped coding noise-like signal and the prediction coefficients.

Further embodiments of the first aspect relate to a method for encoding an audio signal, a method for decoding a received audio signal and to a computer program.

Embodiments of the second aspect provide an encoder for encoding an audio signal. The encoder comprises an analyzer configured for deriving prediction coefficients and a residual signal from an unvoiced frame of the audio signal. The encoder further comprises a gain parameter calculator configured for calculating a first gain parameter information for defining a first excitation signal related to a deterministic codebook and for calculating a second gain parameter information for defining a second excitation signal related to a noise-like signal for the unvoiced frame. The encoder further comprises a bitstream former configured for forming an output signal based on an information related to a voiced signal frame, the first gain parameter information and the second gain parameter information.

Further embodiments of the second aspect provide a decoder for decoding a received audio signal comprising an information related to prediction coefficients. The decoder comprises a first signal generator configured for generating a first excitation signal from a deterministic codebook for a portion of a synthesized signal. The decoder further comprises a second signal generator configured for generating a second excitation signal from a noise-like signal for the portion of the synthesized signal. The decoder further comprises a combiner and a synthesizer, wherein the combiner is configured for combining the first excitation signal and the second excitation signal for generating a combined excitation signal for the portion of the synthesized signal. The synthesizer is configured for synthesizing the portion of the synthesized signal from the combined excitation signal and the prediction coefficients.

Further embodiments of the second aspect provide an encoded audio signal comprising an information related to prediction coefficients, an information related to a deterministic codebook, an information related to a first gain parameter and a second gain parameter and an information related to a voiced and unvoiced signal frame.

Further embodiments of the second aspect provide methods for encoding and decoding an audio signal, a received audio signal respectively and to a computer program.

BRIEF DESCRIPTION OF THE DRAWINGS

Subsequently, embodiments of the present invention are described with respect to the accompanying drawings, in which.

DETAILED DESCRIPTION OF THE INVENTION

Figure 1:
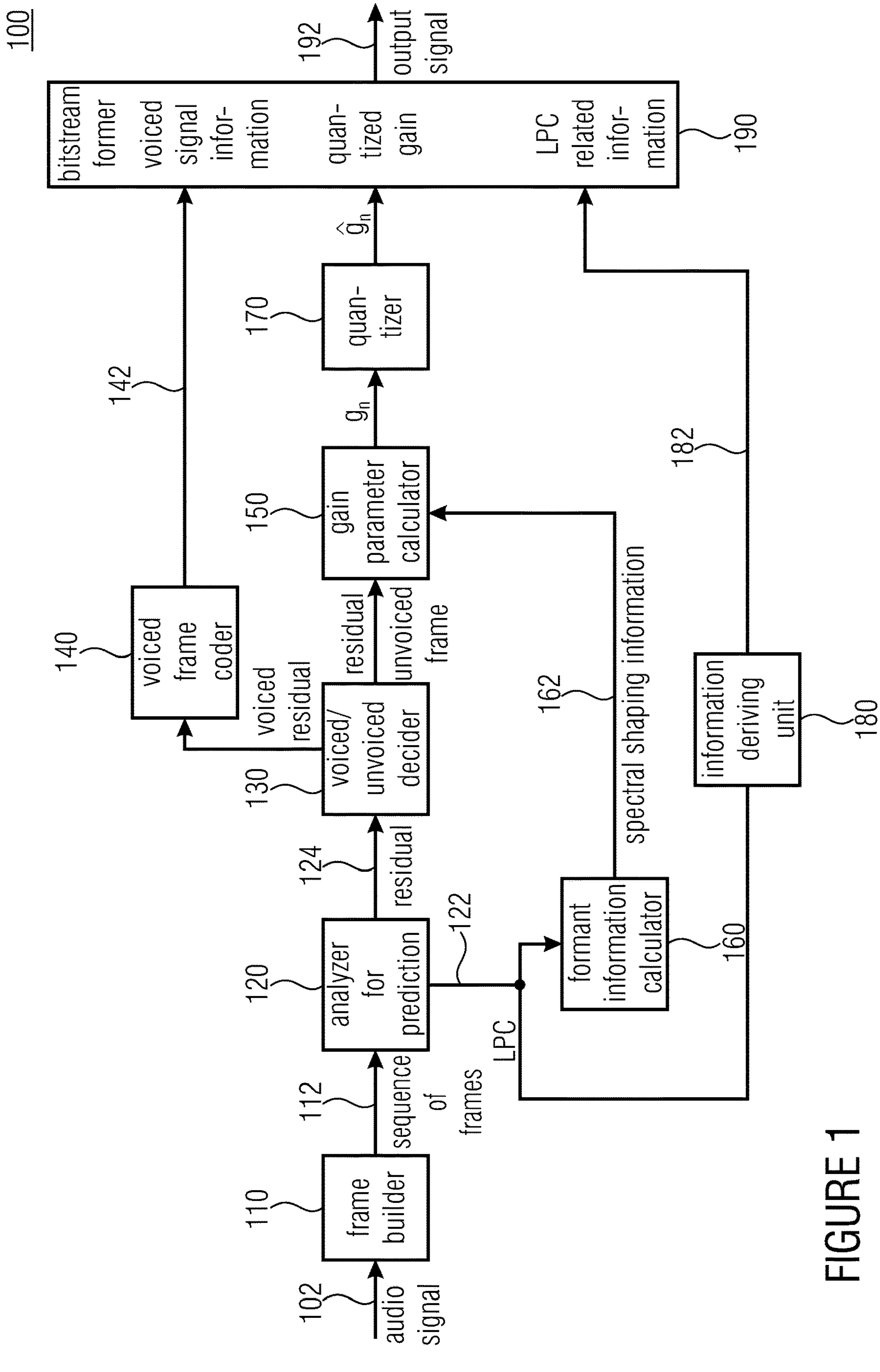
FIG. 1 shows a schematic block diagram of an encoder for encoding an audio signal according to an embodiment of the first aspect.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference will be made to modifying an audio signal. An audio signal may be modified by amplifying and/or attenuating portions of the audio signal. A portion of the audio signal may be, for example a sequence of the audio signal in the time domain and/or a spectrum thereof in the frequency domain. With respect to the frequency domain, the spectrum may be modified by amplifying or attenuating spectral values arranged in or at frequencies or frequency ranges. Modification of the spectrum of the audio signal may comprise a sequence of operations such as an amplification and/or attenuation of a first frequency or frequency range and afterwards an amplification and/or an attenuation of a second frequency or frequency range. The modifications in the frequency domain may be represented as a calculation, e.g. a multiplication, division, summation or the like, of spectral values and gain values and/or attenuation values. Modifications may be performed sequentially such as first multiplying spectral values with a first multiplication value and then with a second multiplication value. Multiplication with the second multiplication value and then with the first multiplication value may allow for receiving an identical or almost identical result. Also, the first multiplication value and the second multiplication value may first be combined and then applied in terms of a combined multiplication value to the spectral values while receiving the same or a comparable result of the operation. Thus, modification steps configured to form or modify a spectrum of the audio signal described below are not limited to the described order but may also be executed in a changed order whilst receiving the same result and/or effect.

FIG. 1 shows a schematic block diagram of an encoder 100 for encoding an audio signal 102. The encoder 100 comprises a frame builder 110 configured to generate a sequence of frames 112 based on the audio signal 102. The sequence 112 comprises a plurality of frames, wherein each frame of the audio signal 102 comprises a length (time duration) in the time domain. For example, each frame may comprise a length of 10 ms, 20 ms or 30 ms.

The encoder 100 comprises an analyzer 120 configured for deriving prediction coefficients (LPC=linear prediction coefficients) 122 and a residual signal 124 from a frame of the audio signal. The frame builder 110 or the analyzer 120 is configured to determine a representation of the audio signal 102 in the frequency domain. Alternatively, the audio signal 102 may be a representation in the frequency domain already.

The prediction coefficients 122 may be, for example linear prediction coefficients. Alternatively, also non-linear prediction may be applied such that the predictor 120 is configured to determine non-linear prediction coefficients. An advantage of linear prediction is given in a reduced computational effort for determining the prediction coefficients.

The encoder 100 comprises a voiced/unvoiced decider 130 configured for determining, if the residual signal 124 was determined from an unvoiced audio frame. The decider 130 is configured for providing the residual signal to a voiced frame coder 140 if the residual signal 124 was determined from a voiced signal frame and to provide the residual signal to a gain parameter calculator 150, if the residual signal 124 was determined from an unvoiced audio frame. For determining if the residual signal 122 was determined from a voiced or an unvoiced signal frame, the decider 130 may use different approaches such as an auto correlation of samples of the residual signal. A method for deciding whether a signal frame was voiced or unvoiced is provided, for example in the ITU (international telecommunication union)—T (telecommunication standardization sector) standard G.718. A high amount of energy arranged at low frequencies may indicate a voiced portion of the signal. Alternatively, an unvoiced signal may result in high amounts of energy at high frequencies. The encoder 100 comprises a formant information calculator 160 configured for calculating a speech related spectral shaping information from the prediction coefficients 122.

The speech related spectral shaping information may consider formant information, for example, by determining frequencies or frequency ranges of the processed audio frame that comprise a higher amount of energy than the neighborhood. The spectral shaping information is able to segment the magnitude spectrum of the speech into formants, i.e. bumps, and non-formants, i.e. valley, frequency regions. The formant regions of the spectrum can be for example derived by using the Immittance Spectral Frequencies (ISF) or Line Spectral Frequencies (LSF) representation of the prediction coefficients 122. Indeed the ISF or LSF represent the frequencies for which the synthesis filter using the prediction coefficients 122 resonates.

The speech related spectral shaping information 162 and the unvoiced residuals are forwarded to the gain parameter calculator 150 which is configured to calculate a gain parameter $g_n$ from the unvoiced residual signal and the spectral shaping information 162. The gain parameter $g_n$ may be a scalar value or a plurality thereof, i.e., the gain parameter may comprise a plurality of values related to an amplification or attenuation of spectral values in a plurality of frequency ranges of a spectrum of the signal to be amplified or attenuated. A decoder may be configured to apply the gain parameter $g_n$ to information of a received encoded audio signal such that portions of the received encoded audio signals are amplified or attenuated based on the gain parameter during decoding. The gain parameter calculator 150 may be configured to determine the gain parameter $g_n$ by one or more mathematical expressions or determination rules resulting in a continuous value. Operations performed digitally, for example, by means of a processor, expressing the result in a variable with a limited number of bits, may result in a quantized gain $\hat{g}_n$. Alternatively, the result may further be quantized according to quantization scheme such that an quantized gain information is obtained. The encoder 100 may therefore comprise a quantizer 170. The quantizer 170 may be configured to quantize the determined gain $g_n$ to a nearest digital value supported by digital operations of the encoder 100. Alternatively, the quantizer 170 may be configured to apply a quantization function (linear or non-linear) to an already digitalized and therefore quantized fain factor $g_n$. A non-linear quantization function may consider, for example, logarithmic dependencies of human hearing highly sensitive at low sound pressure levels and less sensitive at high pressure levels.

The encoder 100 further comprises an information deriving unit 180 configured for deriving a prediction coefficient related information 182 from the prediction coefficients 122. Prediction coefficients such as linear prediction coefficients used for exciting innovative codebooks comprise a low robustness against distortions or errors. Therefore, for example, it is known to convert linear prediction coefficients to inter-spectral frequencies (ISF) and/or to derive line-spectral pairs (LSP) and to transmit an information related thereto with the encoded audio signal. LSP and/or ISF information comprises a higher robustness against distortions in the transmission media, for example error, or calculator errors. The information deriving unit 180 may further comprise a quantizer configured to provide a quantized information with respect to the LSF and/or the ISP.

Alternatively, the information deriving unit may be configured to forward the prediction coefficients 122. Alternatively, the encoder 100 may be realized without the information deriving unit 180. Alternatively, the quantizer may be a functional block of the gain parameter calculator 150 or of the bitstream former 190 such that the bitstream former 190 is configured to receive the gain parameter $g_n$ and to derive the quantized gain $\hat{g}_n$based thereon. Alternatively, when the gain parameter $g_n$ is already quantized, the encoder 100 may be realized without the quantizer 170.

The encoder 100 comprises a bitstream former 190 configured to receive a voiced signal, a voiced information 142 related to a voiced frame of an encoded audio signal respectively provided by the voiced frame coder 140, to receive the quantized gain $\hat{g}_n$and the prediction coefficients related information 182 and to form an output signal 192 based thereon.

The encoder 100 may be part of a voice encoding apparatus such as a stationary or mobile telephone or an apparatus comprising a microphone for transmission of audio signals such as a computer, a tablet PC or the like. The output signal 192 or a signal derived thereof may be transmitted, for example via mobile communications (wireless) or via wired communications such as a network signal.

An advantage of the encoder 100 is that the output signal 192 comprises information derived from a spectral shaping information converted to the quantized gain $\hat{g}_n$. Therefore, decoding of the output signal 192 may allow for achieving or obtaining further information that is speech related and therefore to decode the signal such that the obtained decoded signal comprises a high quality with respect to a perceived level of a quality of speech.

Figure 2:
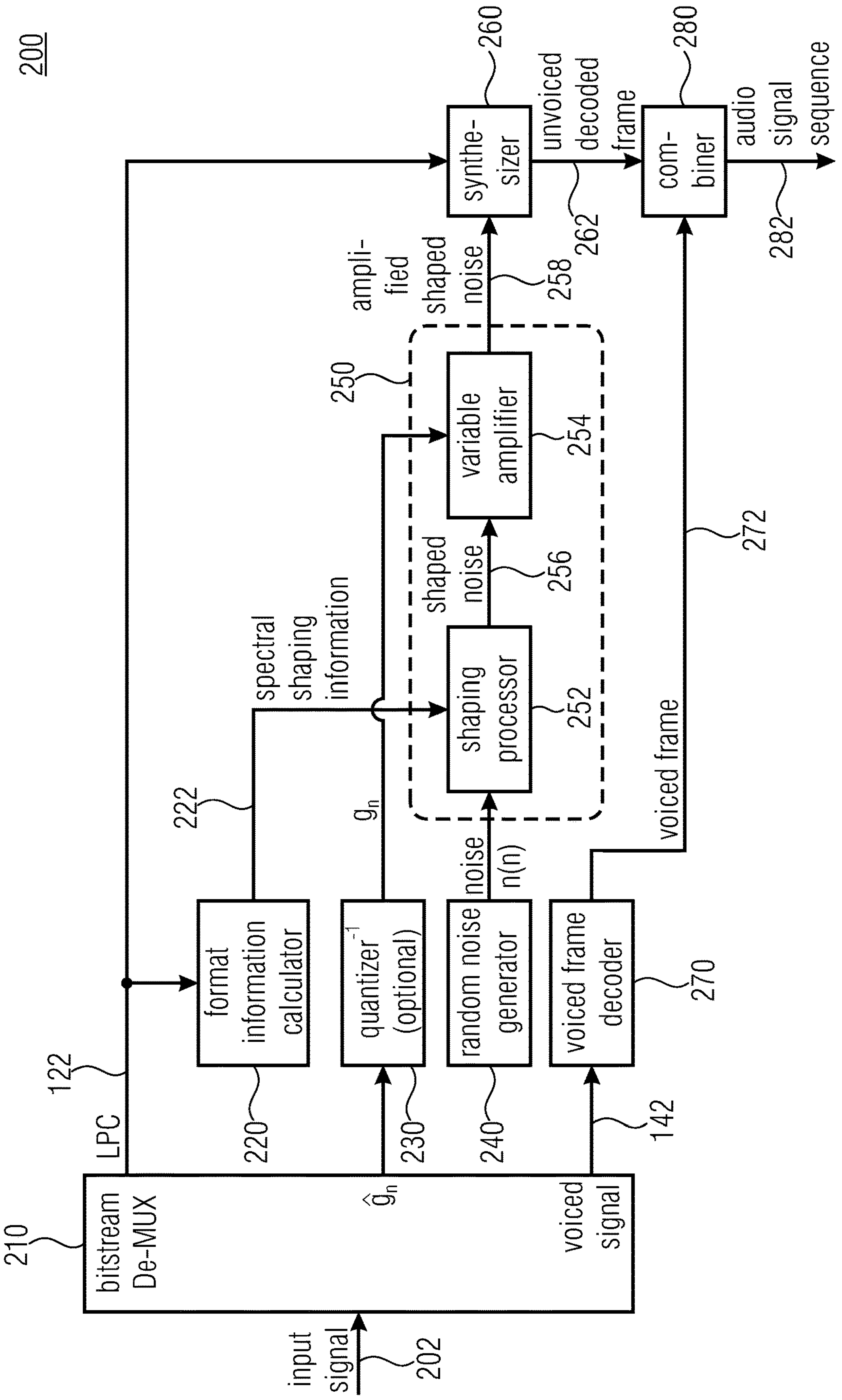
FIG. 2 shows a schematic block diagram of a decoder for decoding a received input signal according to an embodiment of the first aspect.

FIG. 2 shows a schematic block diagram of a decoder 200 for decoding a received input signal 202. The received input signal 202 may correspond, for example to the output signal 192 provided by the encoder 100, wherein the output signal 192 may be encoded by high level layer encoders, transmitted through a media, received by a receiving apparatus decoded at high layers, yielding in the input signal 202 for the decoder 200.

The decoder 200 comprises a bitstream deformer (demultiplexer; DE-MUX) for receiving the input signal 202. The bitstream deformer 210 is configured to provide the prediction coefficients 122, the quantized gain $\hat{g}_n$and the voiced information 142. For obtaining the prediction coefficients 122, the bitstream deformer may comprise an inverse information deriving unit performing an inverse operation when compared to the information deriving unit 180. Alternatively, the decoder 200 may comprise a not shown inverse information deriving unit configured for executing the inverse operation with respect to the information deriving unit 180. In other words, the prediction coefficients are decoded i.e., restored.

The decoder 200 comprises a formant information calculator 220 configured for calculating a speech related spectral shaping information from the prediction coefficients 122 as it was described for the formant information calculator 160. The formant information calculator 220 is configured to provide speech related spectral shaping information 222. Alternatively, the input signal 202 may also comprise the speech related spectral shaping information 222, wherein transmission of the prediction coefficients or information related thereto such as, for example quantized LSF and/or ISF instead of the speech related spectral shaping information 222 allows for a lower bitrate of the input signal 202.

The decoder 200 comprises a random noise generator 240 configured for generating a noise-like signal, which may simplified be denoted as noise signal. The random noise generator 240 may be configured to reproduce a noise signal that was obtained, for example when measuring and storing a noise signal. A noise signal may be measured and recorded, for example, by generating thermal noise at a resistance or another electrical component and by storing recorded data on a memory. The random noise generator 240 is configured to provide the noise(-like) signal n(n).

The decoder 200 comprises a shaper 250 comprising a shaping processor 252 and a variable amplifier 254. The shaper 250 is configured for spectrally shaping a spectrum of the noise signal n(n). The shaping processor 252 is configured for receiving the speech related spectral shaping information and for shaping the spectrum of the noise signal n(n), for example by multiplying spectral values of the spectrum of the noise signal n(n) and values of the spectral shaping information. The operation can also be performed in the time domain by a convoluting the noise signal n(n) with a filter given by the spectral shaping information. The shaping processor 252 is configured for providing a shaped noise signal 256, a spectrum thereof respectively to the variable amplifier 254. The variable amplifier 254 is configured for receiving the gain parameter $g_n$ and for amplifying the spectrum of the shaped noise signal 256 to obtain an amplified shaped noise signal 258. The amplifier may be configured to multiply the spectral values of the shaped noise signal 256 with values of the gain parameter $g_n$. As stated above, the shaper 250 may be implemented such that the variable amplifier 254 is configured to receive the noise signal n(n) and to provide an amplified noise signal to the shaping processor 252 configured for shaping the amplified noise signal. Alternatively, the shaping processor 252 may be configured to receive the speech related spectral shaping information 222 and the gain parameter $g_n$ and to apply sequentially, one after the other, both information to the noise signal n(n) or to combine both information, e.g., by multiplication or other calculations and to apply a combined parameter to the noise signal n(n).

The noise-like signal n(n) or the amplified version thereof shaped with the speech related spectral shaping information allows for the decoded audio signal 282 comprising a more speech related (natural) sound quality. This allows for obtaining high quality audio signals and/or to reduce bitrates at encoder side while maintaining or enhancing the output signal 282 at the decoder with a reduced extent.

The decoder 200 comprises a synthesizer 260 configured for receiving the prediction coefficients 122 and the amplified shaped noise signal 258 and for synthesizing a synthesized signal 262 from the amplified shaped noise-like signal 258 and the prediction coefficients 122. The synthesizer 260 may comprise a filter and may be configured for adapting the filter with the prediction coefficients. The synthesizer may be configured to filter the amplified shaped noise-like signal 258 with the filter. The filter may be implemented as software or as a hardware structure and may comprise an infinite impulse response (IIR) or a finite impulse response (FIR) structure.

The synthesized signal corresponds to an unvoiced decoded frame of an output signal 282 of the decoder 200. The output signal 282 comprises a sequence of frames that may be converted to a continuous audio signal.

The bitstream deformer 210 is configured for separating and providing the voiced information signal 142 from the input signal 202. The decoder 200 comprises a voiced frame decoder 270 configured for providing a voiced frame based on the voiced information 142. The voiced frame decoder (voiced frame processor) is configured to determine a voiced signal 272 based on the voiced information 142. The voiced signal 272 may correspond to the voiced audio frame and/or the voiced residual of the decoder 100.

The decoder 200 comprises a combiner 280 configured for combining the unvoiced decoded frame 262 and the voiced frame 272 to obtain the decoded audio signal 282.

Alternatively, the shaper 250 may be realized without an amplifier such that the shaper 250 is configured for shaping the spectrum of the noise-like signal n(n) without further amplifying the obtained signal. This may allow for a reduced amount of information transmitted by the input signal 222 and therefore for a reduced bitrate or a shorter duration of a sequence of the input signal 202. Alternatively, or in addition, the decoder 200 may be configured to only decode unvoiced frames or to process voiced and unvoiced frames both by spectrally shaping the noise signal n(n) and by synthesizing the synthesized signal 262 for voiced and unvoiced frames. This may allow for implementing the decoder 200 without the voiced frame decoder 270 and/or without a combiner 280 and thus lead to a reduced complexity of the decoder 200.

The output signal 192 and/or the input signal 202 comprise information related to the prediction coefficients 122, an information for a voiced frame and an unvoiced frame such as a flag indicating if the processed frame is voiced or unvoiced and further information related to the voiced signal frame such as a coded voiced signal. The output signal 192 and/or the input signal 202 comprise further a gain parameter or a quantized gain parameter for the unvoiced frame such that the unvoiced frame may be decoded based on the prediction coefficients 122 and the gain parameter $g_n$, $\hat{g}_n$, respectively.

Figure 3:
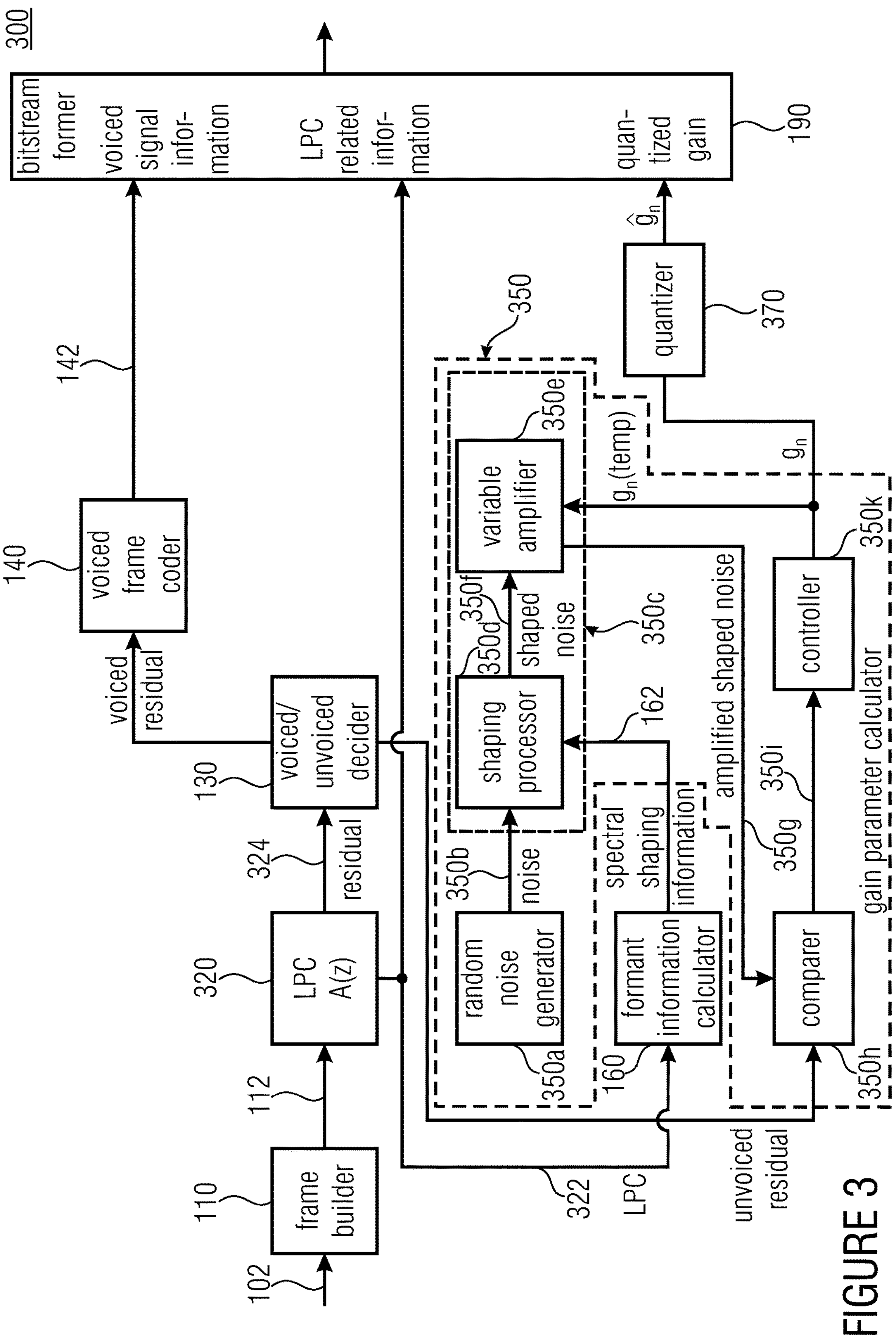
FIG. 3 shows a schematic block diagram of a further encoder for encoding the audio signal according to an embodiment of the first aspect.

FIG. 3 shows a schematic block diagram of an encoder 300 for encoding the audio signal 102. The encoder 300 comprises the frame builder 110, a predictor 320 configured for determining linear prediction coefficients 322 and a residual signal 324 by applying a filter A(z) to the sequence of frames 112 provided by the frame builder 110. The encoder 300 comprises the decider 130 and the voiced frame coder 140 to obtain the voiced signal information 142. The encoder 300 further comprises the formant information calculator 160 and a gain parameter calculator 350.

The gain parameter calculator 350 is configured for providing a gain parameter $g_n$ as it was described above. The gain parameter calculator 350 comprises a random noise generator 350*a* for generating an encoding noise-like signal 350*b*. The gain calculator 350 further comprises a shaper 350*c* having a shaping processor 350*d* and a variable amplifier 350*e*. The shaping processor 350*d* is configured for receiving the speech related shaping information 162 and the noise-like signal 350*b*, and to shape a spectrum of the noise-like signal 350*b* with the speech related spectral shaping information 162 as it was described for the shaper 250. The variable amplifier 350*e* is configured for amplifying a shaped noise-like signal 350*f* with a gain parameter $g_n$(temp) which is a temporary gain parameter received from a controller 350*k*. The variable amplifier 350*e* is further configured for providing an amplified shaped noise-like signal 350*g* as it was described for the amplified noise-like signal 258. As it was described for the shaper 250, an order of shaping and amplifying the noise-like signal may be combined or changed when compared to FIG. 3.

The gain parameter calculator 350 comprises a comparer 350*h* configured for comparing the unvoiced residual provided by the decider 130 and the amplified shaped noise-like signal 350*g*. The comparer is configured to obtain a measure for a likeness of the unvoiced residual and the amplified shaped noise-like signal 350*g*. For example, the comparer 350*h* may be configured for determining a cross-correlation of both signals. Alternatively, or in addition, the comparer 350*h* may be configured for comparing spectral values of both signals at some or all frequency bins. The comparer 350*h* is further configured to obtain a comparison result 350*i*.

The gain parameter calculator 350 comprises the controller 350*k* configured for determining the gain parameter $g_n$(temp) based on the comparison result 350*i*. For example, when the comparison result 350*i* indicates that the amplified shaped noise-like signal comprises an amplitude or magnitude that is lower than a corresponding amplitude or magnitude of the unvoiced residual, the controller may be configured to increase one or more values of the gain parameter $g_n$(temp) for some or all of the frequencies of the amplified noise-like signal 350*g*. Alternatively, or in addition, the controller may be configured to reduce one or more values of the gain parameter $g_n$(temp) when the comparison result 350*i* indicates that the amplified shaped noise-like signal comprises a too high magnitude or amplitude, i.e., that the amplified shaped noise-like signal is too loud. The random noise generator 350*a*, the shaper 350*c*, the comparer 350*h* and the controller 350*k* may be configured to implement a closed-loop optimization for determining the gain parameter $g_n$(temp). When the measure for the likeness of the unvoiced residual to the amplified shaped noise-like signal 350*g*, for example, expressed as a difference between both signals, indicates that the likeness is above a threshold value, the controller 350*k* is configured to provide the determined gain parameter $g_n$. A quantizer 370 is configured to quantize the gain parameter $g_n$ to obtain the quantized gain parameter $\hat{g}_n$.

The random noise generator 350*a* may be configured to deliver a Gaussian-like noise. The random noise generator 350*a* may be configured for running (calling) a random generator with a number of n uniform distributions between a lower limit (minimum value) such as −1 and an upper limit (maximum value), such as +1. For example, the random noise generator 350 is configured for calling three times the random generator. As digitally implemented random noise generators may output pseudo-random values an addition or superimposing of a plurality or a multitude of pseudo-random functions may allow for obtaining a sufficiently random-distributed function. This procedure follows the Central Limit Theorem. The random noise generator 350*a* ma be configured to call the random generator at least two, three or more times as indicated by the following pseudo-code:

```
for(i=0;i<Ls;i++){
    n[i]=uniform_random( );
    n[i]+=uniform_random( );
    n[i]+=uniform_random( );
}
```

Alternatively, the random noise generator 350*a* may generate the noise-like signal from a memory as it was described for the random noise generator 240. Alternatively, the random noise generator 350*a* may comprise, for example, an electrical resistance or other means for generating a noise signal by executing a code or by measuring physical effects such as thermal noise.

The shaping processor 350*b* may be configured to add a formantic structure and a tilt to the noise-like signals 350*b* by filtering the noise-like signal 350*b* with fe(n) as stated above. The tilt may be added by filtering the signal with a filter t(n) comprising a transfer function based on:

$$Ft(z)=1-\beta z^{-1}$$

wherein the factor β may be deduced from the voicing of the previous subframe:

$$\text{voicing}=\frac{\text{energy(contibution of } AC) - \text{energy(contibution of } IC)}{\text{energy(sum of contributions)}}$$

wherein AC is an abbreviation for adaptive codebook and IC is an abbreviation for innovative codebook.

$$\beta=0.25\cdot(1+\text{voicing})$$

The gain parameter $g_n$, the quantized gain parameter $\hat{g}_n$ respectively allows for providing an additional information that may reduce an error or a mismatch between the encoded signal and the corresponding decoded signal, decoded at a decoder such as the decoder 200.

With respect to the determination rule $$Ffe(z)=\frac{A(z/w1)}{A(z/w2)}$$

the parameter w1 may comprise a positive non-zero value of at most 1.0, advantageously of at least 0.7 and at most 0.8 and more advantageously comprise a value of 0.75. The parameter w2 may comprise a positive non-zero scalar value of at most 1.0, advantageously of at least 0.8 and at most 0.93 and more advantageously comprise a value of 0.9. The parameter w2 is advantageously greater than w1.

Figure 4:
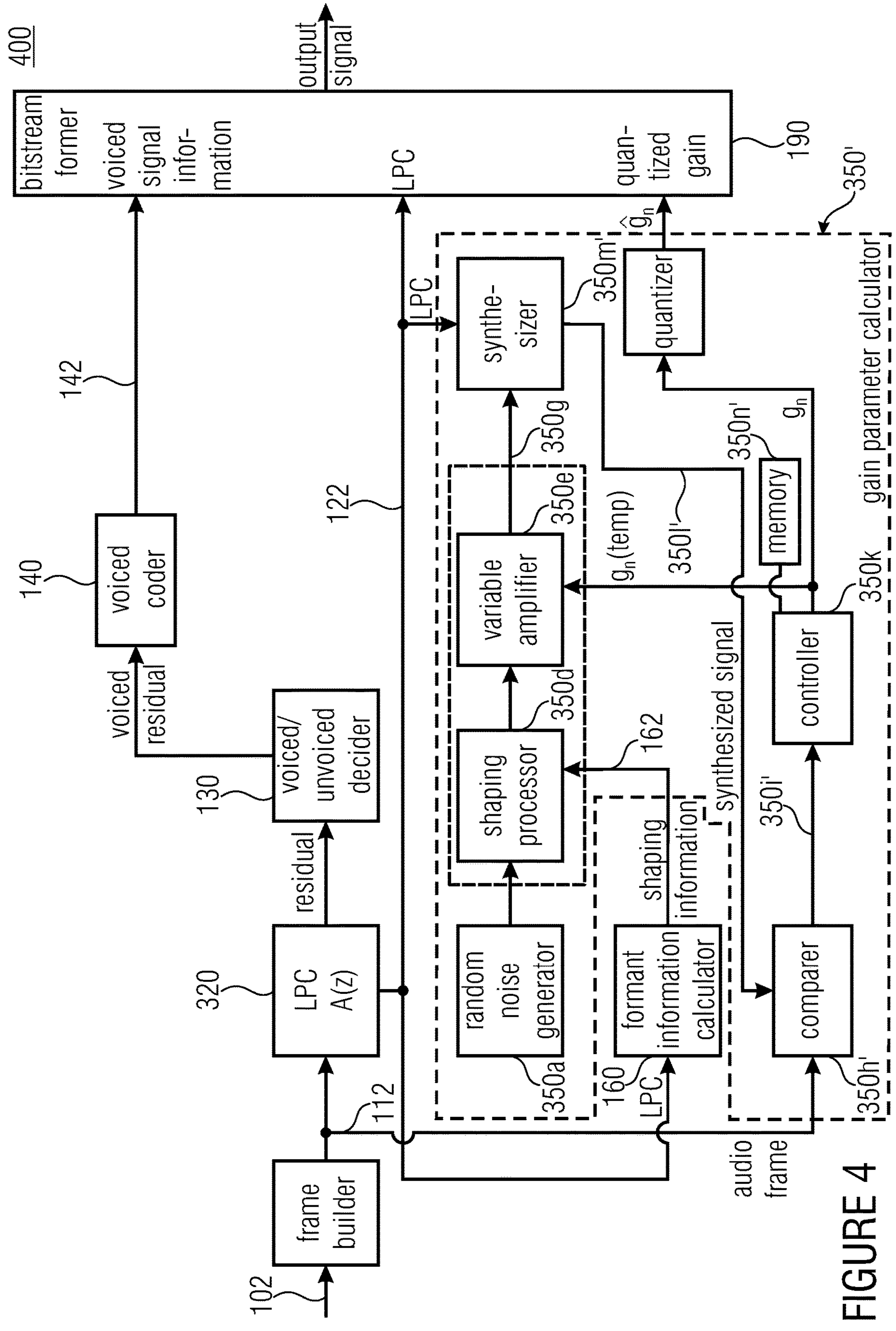
FIG. 4 shows a schematic block diagram of an encoder comprising a varied gain parameter calculator when compared to FIG. 3 according to an embodiment of the first aspect.

FIG. 4 shows a schematic block diagram of an encoder 400. The encoder 400 is configured to provide the voiced signal information 142 as it was described for the encoders 100 and 300. When compared to the encoder 300, the encoder 400 comprises a varied gain parameter calculator 350'. A comparer 350*h'* is configured to compare the audio frame 112 and a synthesized signal 350*l'* to obtain a comparison result 350*i'*. The gain parameter calculator 350' comprises a synthesizer 350*m'* configured for synthesizing the synthesized signal 350*l'* based on the amplified shaped noise-like signal 350*g* and the prediction coefficients 122.

Basically, the gain parameter calculator 350' implements at least partially a decoder by synthesizing the synthesized signal 350*l'*. When compared to the encoder 300 comprising the comparer 350*h* configured for comparing the unvoiced residual and the amplified shaped noise-like signal, the encoder 400 comprises the comparer 350*h'*, which is configured to compare the (probably complete) audio frame and the synthesized signal.

This may allow for a higher precision as the frames of the signal and not only parameters thereof are compared to each other. The higher precision may entail an increased computational effort as the audio frame 122 and the synthesized signal 350*l'* may comprise a higher complexity when compared to the residual signal and to the amplified shaped noise-like information such that comparing both signals is also more complex. In addition, synthesis has to be calculated necessitating computational efforts by the synthesizer 350*m'*.

The gain parameter calculator 350' comprises a memory 350*n'* configured for recording an encoding information comprising the encoding gain parameter $g_n$ or a quantized version $\hat{g}_n$ thereof. This allows the controller 350*k* to obtain the stored gain value when processing a subsequent audio frame. For example, the controller may be configured to determine a first (set of) value(s), i.e., a first instance of the gain factor $g_n$(temp) based or equal to the value of $g_n$ for the previous audio frame.

Figure 5:
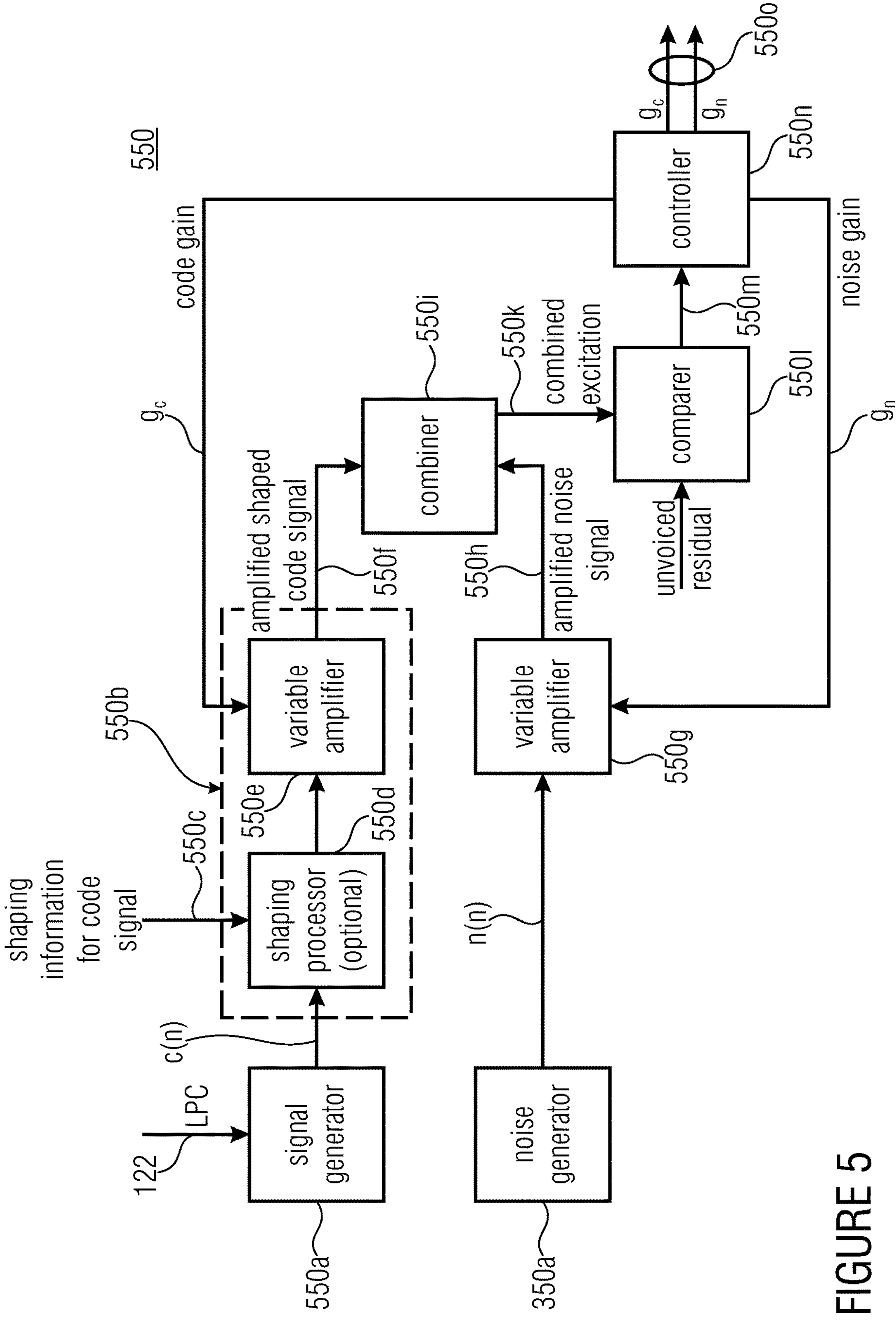
FIG. 5 shows a schematic block diagram of a gain parameter calculator configured for calculating a first gain parameter information and for shaping a code excited signal according to an embodiment of the second aspect.

FIG. 5 shows a schematic block diagram of a gain parameter calculator 550 configured for calculating a first gain parameter information $g_n$ according to the second aspect. The gain parameter calculator 550 comprises a signal generator 550*a* configured for generating an excitation signal c(n. The signal generator 550*a* comprises a deterministic codebook and an index within the codebook to generate the signal c(n). I.e., an input information such as the prediction coefficients 122 results in a deterministic excitation signal c(n). The signal generator 550*a* may be configured to generate the excitation signal c(n) according to an innovative codebook of a CELP coding scheme. The codebook may be determined or trained according to measured speech data in previous calibration steps. The gain parameter calculator comprises a shaper 550*b* configured for shaping a spectrum of the code signal c(n) based on a speech related shaping information 550*c* for the code signal c(n). The speech related shaping information 550*c* may be obtained from the formant information controller 160. The shaper 550*b* comprises a shaping processor 550*d* configured for receiving the shaping information 550*c* for shaping the code signal. The shaper 550*b* further comprises a variable amplifier 550*e* configured for amplifying the shaped code signal c(n) to obtain an amplified shaped code signal 550*f*. Thus, the code gain parameter is configured for defining the code signal c(n) which is related to a deterministic codebook.

The gain parameter calculator 550 comprises the noise generator 350*a* configured for providing the noise(-like) signal n(n) and an amplifier 550*g* configured for amplifying the noise signal n(n) based on the noise gain parameter $g_n$ to obtain an amplified noise signal 550*h*. The gain parameter calculator comprises a combiner 550*i* configured for combining the amplified shaped code signal 550*f* and the amplified noise signal 550*h* to obtain a combined excitation signal 550*k*. The combiner 550*i* may be configured, for example, for spectrally adding or multiplying spectral values of the amplified shaped code signal and the amplified noise signal 550*f* and 550*h*. Alternatively, the combiner 550*i* may be configured to convolute both signals 550*f* and 550*h*.

As described above for the shaper 350*c*, the shaper 550*b* may be implemented such that first the code signal c(n) is amplified by the variable amplifier 550*e* and afterwards shaped by the shaping processor 550*d*. Alternatively, the shaping information 550*c* for the code signal c(n) may be combined with the code gain parameter information $g_c$ such that a combined information is applied to the code signal c(n).

The gain parameter calculator 550 comprises a comparer 550*l* configured for comparing the combined excitation signal 550*k* and the unvoiced residual signal obtained for the voiced/unvoiced decider 130. The comparer 550*l* may be the comparer 550*h* and is configured for providing a comparison result, i.e., a measure 550*m* for a likeness of the combined excitation signal 550*k* and the unvoiced residual signal. The code gain calculator comprises a controller 550*n* configured for controlling the code gain parameter information $g_c$ and the noise gain parameter information $g_n$. The code gain parameter $g_c$ and the noise gain parameter information $g_n$ may comprise a plurality or a multitude of scalar or imaginary values that may be related to a frequency range of the noise signal n(n) or a signal derived thereof or to a spectrum of the code signal c(n) or a signal derived thereof.

Alternatively, the gain parameter calculator 550 may be implemented without the shaping processor 550*d*. Alternatively, the shaping processor 550*d* may be configured to shape the noise signal n(n) and to provide a shaped noise signal to the variable amplifier 550*g*.

Thus, by controlling both gain parameter information $g_c$ and $g_n$, a likeness of the combined excitation signal 550*k* when compared to the unvoiced residual may be increased such that a decoder receiving information to the code gain parameter information $g_c$ and the noise gain parameter information $g_n$ may reproduce an audio signal which comprises a good sound quality. The controller 550*n* is configured to provide an output signal 550*o* comprising information related to the code gain parameter information $g_c$ and the noise gain parameter information $g_n$. For example, the signal 550*o* may comprise both gain parameter information $g_n$ and $g_c$ as scalar or quantized values or as values derived thereof, for example, coded values.

Figure 6:
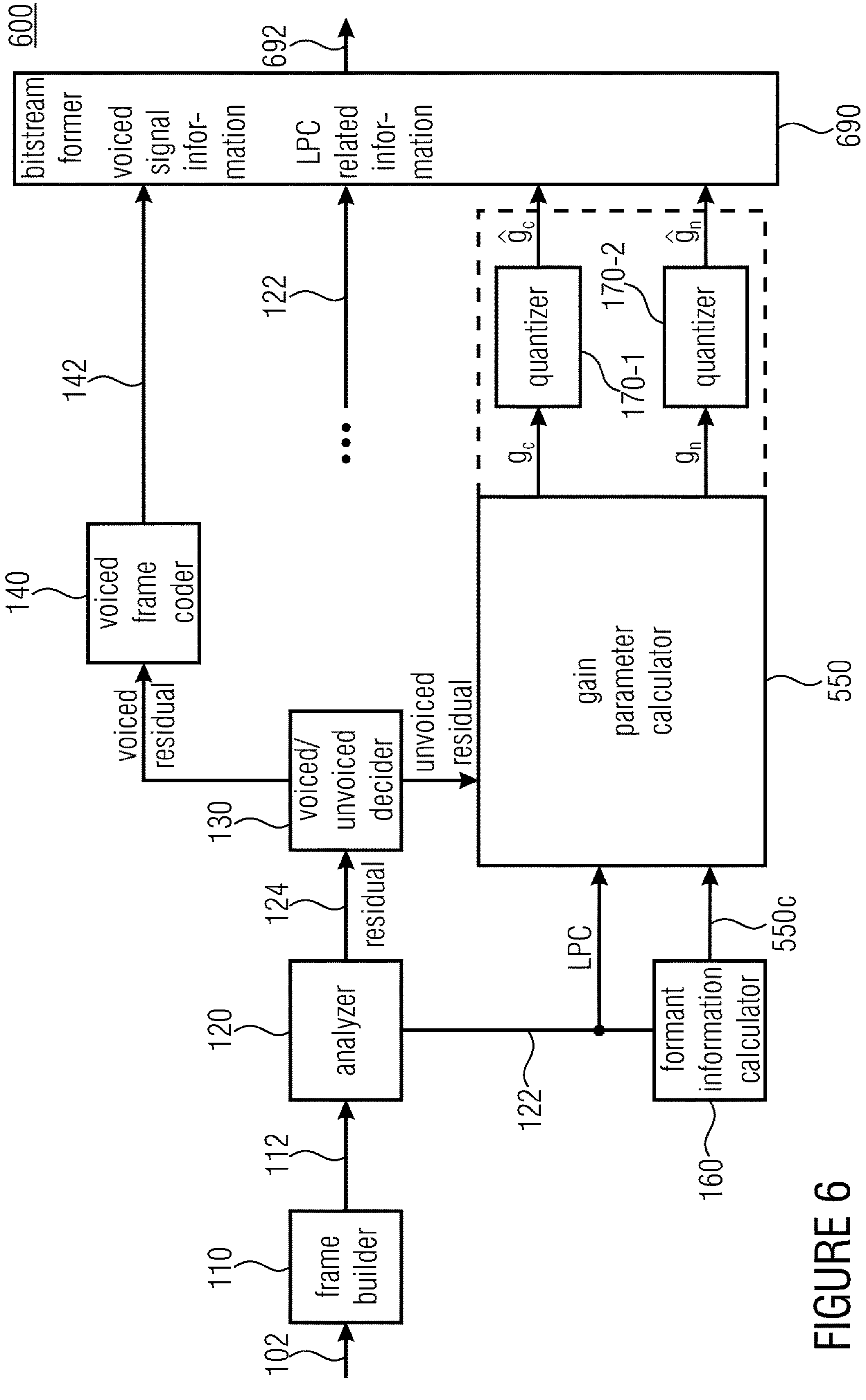
FIG. 6 shows a schematic block diagram of an encoder for encoding the audio signal and comprising the gain parameter calculator described in FIG. 5 according to an embodiment of the second aspect.

FIG. 6 shows a schematic block diagram of an encoder 600 for encoding the audio signal 102 and comprising the gain parameter calculator 550 described in FIG. 5. The encoder 600 may be obtained, for example by modifying the encoder 100 or 300. The encoder 600 comprises a first quantizer 170-1 and a second quantizer 170-2. The first quantizer 170-1 is configured for quantizing the gain parameter information $g_c$ for obtaining a quantized gain parameter information $\hat{g}_c$. The second quantizer 170-2 is configured for quantizing the noise gain parameter information $g_n$ for obtaining a quantized noise gain parameter information $\hat{g}_n$.

A bitstream former 690 is configured for generating an output signal 692 comprising the voiced signal information 142, the LPC related information 122 and both quantized gain parameter information $\hat{g}_c$ and $\hat{g}_n$. When compared to the output signal 192, the output signal 692 is extended or upgraded by the quantized gain parameter information $\hat{g}_c$. Alternatively, the quantizer 170-1 and/or 170-2 may be a part of the gain parameter calculator 550. Further one of the quantizers 170-1 and/or 170-2 may be configured to obtain both quantized gain parameters $\hat{g}_c$ and $\hat{g}_n$.

Alternatively, the encoder 600 may be configured to comprise one quantizer configured for quantizing the code gain parameter information $g_c$ and the noise gain parameter $g_n$ for obtaining the quantized parameter information $\hat{g}_c$ and $\hat{g}_n$. Both gain parameter information may be quantized, for example, sequentially.

The formant information calculator 160 is configured to calculate the speech related spectral shaping information 550*c* from the prediction coefficients 122.

Figure 7:
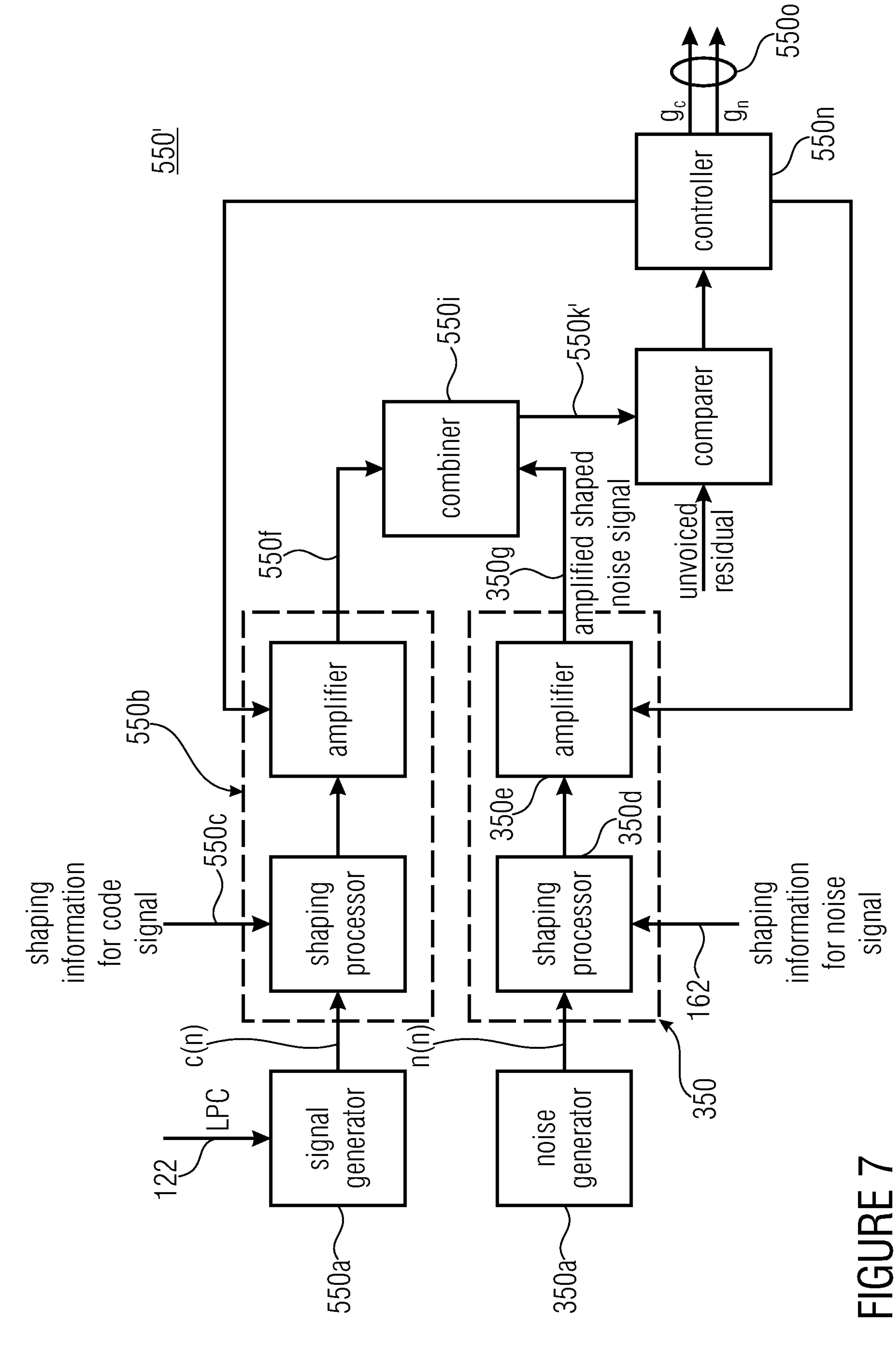
FIG. 7 shows a schematic block diagram of a gain parameter calculator that comprises a further shaper configured for shaping a noise-like signal when compared to FIG. 5 according to an embodiment of the second aspect.

FIG. 7 shows a schematic block diagram of a gain parameter calculator 550' that is modified when compared to the gain parameter calculator 550. The gain parameter calculator 550' comprises the shaper 350 described in FIG. 3 instead of the amplifier 550*g*. The shaper 350 is configured to provide the amplified shaped noise signal 350*g*. The combiner 550*i* is configured to combine the amplified shaped code signal 550*f* and the amplified shaped noise signal 350*g* to provide a combined excitation signal 550*k'*. The formant information calculator 160 is configured to provide both speech related formant information 162 and 550*c*. The speech related formant information 550*c* and 162 may be equal. Alternatively, both information 550*c* and 162 may differ from each other. This allows for a separate modeling, i.e., shaping of the code generated signal c(n) and n(n).

The controller 550*n* may be configured for determining the gain parameter information $g_c$ and $g_n$ for each subframe of a processed audio frame. The controller may be configured to determine, i.e., to calculate, the gain parameter information $g_c$ and $g_n$ based on the details set forth below.

First, the average energy of the subframe may be computed on the original short-term prediction residual signal available during the LPC analysis, i.e., on the unvoiced residual signal. The energy is averaged over the four subframes of the current frame in the logarithmic domain by:

$$nrg = \frac{10}{4} * \sum_{l=0}^{3} \log_{10}\left(\sum_{n=0}^{Lsf-1} \frac{res^2(l \cdot Lsf + n)}{Lsf}\right)$$

Wherein Lsf is the size of a subframe in samples. In this case, the frame is divided in 4 subframes. The averaged energy may then be coded on a number of bits, for example, three, four or five, by using a stochastic codebook previously trained. The stochastic codebook may comprise a number of entries (size) according to a number of different values that may be represented by the number of bits, e.g. a size of 8 for a number of 3 bits, a size of 16 for a number of 4 bits or a number of 32 for a number of 5 bits. A quantized gain $\widehat{nrg}$ may be determined from the selected codeword of the codebook. For each subframe the two gain information $g_c$ and $g_n$ are computed. The gain of code $g_c$ may be computed, for example based on:

$$g_c = \frac{\sum_{n=0}^{Lsf-1} xw(n)\cdot cw(n)}{\sum_{n=0}^{Lsf-1} cw(n)\cdot cw(n)}$$

where cw(n) is, for example, the fixed innovation selected from the fixed codebook comprised by the signal generator 550*a* filtered by the perceptual weighted filter. The expression xw(n) corresponds to the conventional perceptual target excitation computed in CELP encoders. The code gain information $g_c$ may then be normalized for obtaining a normalized gain $g_{nc}$ based on:

$$g_{nc} = g_c \cdot \frac{\sum_{n=0}^{Lsf-1} \sqrt{c(n)\cdot c(n)}}{Lsf * 10^{\widetilde{nrg}/20}}$$

The normalized gain $g_{nc}$ may be quantized, for example by the quantizer 170-1. Quantization may be performed according to a linear or logarithmic scale. A logarithmic scale may comprise a scale of size of 4, 5 or more bits. For example, the logarithmic scale comprises a size of 5 bits. Quantization may be performed based on:

$$\text{Index}_{nc} = \lfloor 20*\log_{10}((g_{nc}+20)/1.25)+0.5 \rfloor$$

wherein $\text{Index}_{nc}$ may be limited between 0 and 31, if the logarithmic scale comprises 5 bits. The $\text{Index}_{nc}$ may be the quantized gain parameter information. The quantized gain of code $\hat{g}_c$, may then be expressed based on:

$$\widehat{g_c} = 10^{10(index_{nc}\cdot 1.25-20)/20)} \cdot \frac{Lsf * 10^{\widetilde{nrg}/20}}{\sum_{n=0}^{Lsf-1} \sqrt{c(n)\cdot c(n)}}$$

The gain of code may be computed in order to minimize the mean squared root error or mean squared error (MSE)

$$\frac{1}{Lsf} \sum_{n=0}^{Lsf-1} (xw(n) - g_c \cdot cw(n))^2$$

wherein Lsf corresponds to line spectral frequencies determined from the prediction coefficients 122.

The noise gain parameter information may be determined in terms of energy mismatch by minimizing an error based on $$\frac{1}{Lsf} \left| \sum_{n=0}^{Lsf-1} k \cdot xw^2(n) - \sum_{n=0}^{Lsf-1} (\widehat{g_c} \cdot cw(n) + g_n nw(n))^2 \right|$$

The variable k is an attenuation factor that may be varied dependent or based on the prediction coefficients, wherein the prediction coefficients may allow for determining if speech comprises a low portion of background noise or even no background noise (clean speech). Alternatively, the signal may also be determined as being a noisy speech, for example when the audio signal or a frame thereof comprises changes between unvoiced and non-unvoiced frames. The variable k may be set to a value of at least 0.85, of at least 0.95 or even to a value of 1 for clean speech, where high dynamic of energy is perceptually important. The variable k may be set to a value of at least 0.6 and at most 0.9, advantageously to a value of at least 0.7 and at most 0.85 and more advantageously to a value of 0.8 for noisy speech where the noise excitation is made more conservative for avoiding fluctuation in the output energy between unvoiced and non-unvoiced frames. The error (energy mismatch) may be computed for each of these quantized gain candidates $\hat{g}_c$. A frame divided into four subframes may result in four quantized gain candidates $\hat{g}_c$. The one candidate which minimizes the error may be output by the controller. The quantized gain of noise (noise gain parameter information) may be computed based on:

$$\widehat{g_n} = (index_n \cdot 0.25 + 0.25)\cdot \widehat{g_c} \cdot \frac{\sum_{n=0}^{Lsf-1} \sqrt{c(n)\cdot c(n)}}{\sum_{n=0}^{Lsf-1} \sqrt{n(n)\cdot n(n)}}$$

wherein $\text{Index}_n$ is limited between 0 and 3 according to the four candidates. A resulting combined excitation signal, such as the excitation signal 550*k* or 550*k*' may be obtained based on:

$$e(n) = \widehat{g_c} \cdot c(n) + \widehat{g_n} \cdot n(n)$$

wherein e(n) is the combined excitation signal 550*k* or 550*k'*.

An encoder 600 or a modified encoder 600 comprising the gain parameter calculator 550 or 550' may allow for an unvoiced coding based on a CELP coding scheme. The CELP coding scheme may be modified based on the following exemplary details for handling unvoiced frames:

- LTP parameters are not transmitted as there is almost no periodicity in unvoiced frames and the resulting coding gain is very low. The adaptive excitation is set to zero.
- The saving bits are reported to the fixed codebook. More pulses can be coded for the same bit-rate, and quality can be then improved.
- At low rates, i.e. for rates between 6 and 12 kbps, the pulse coding is not sufficient for modeling properly the noise-like target excitation of unvoiced frame. A Gaussian codebook is added to the fixed codebook for building the final excitation.

Figure 8:
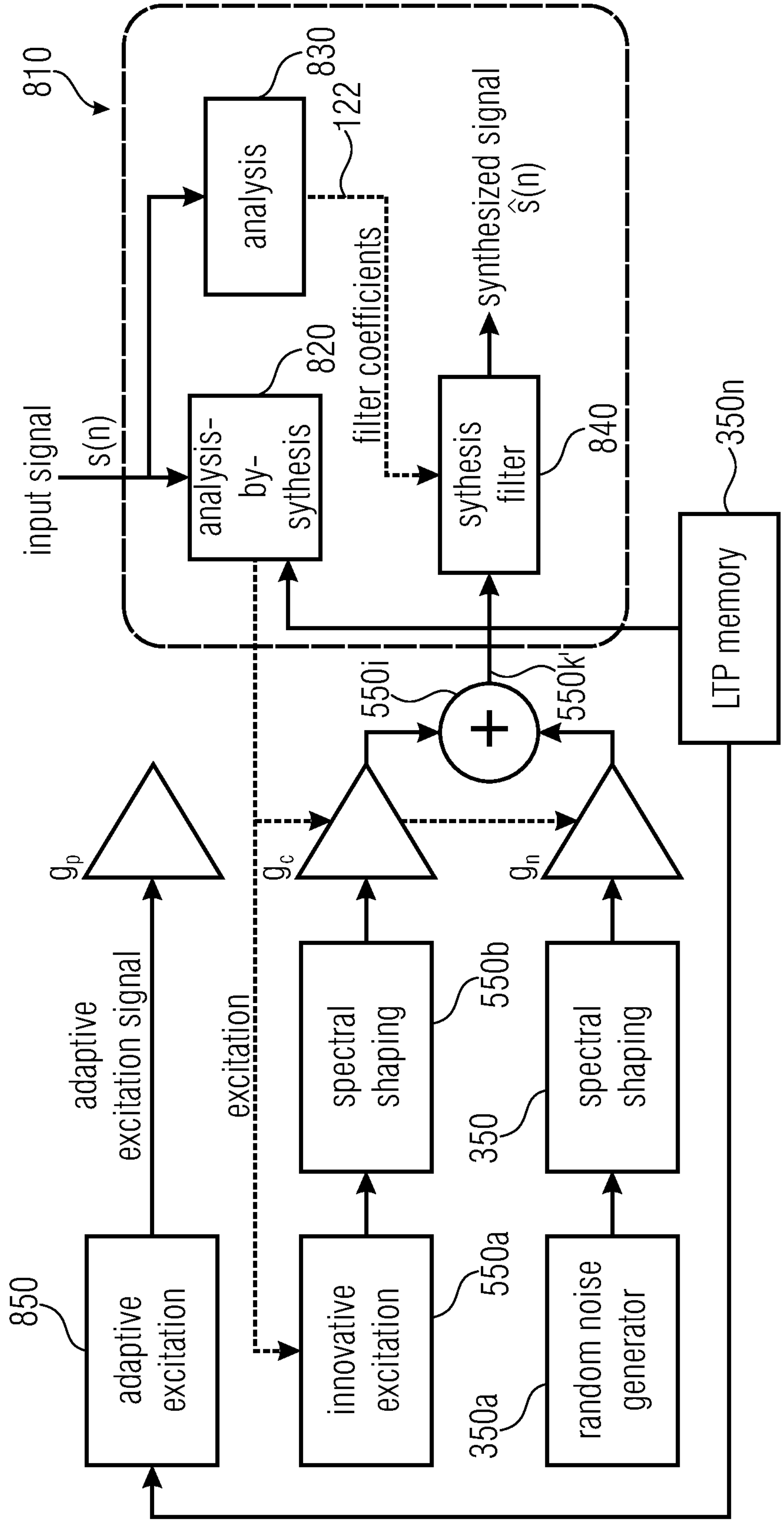
FIG. 8 shows a schematic block diagram of an unvoiced coding scheme for CELP according to an embodiment of the second aspect.

FIG. 8 shows a schematic block diagram of an unvoiced coding scheme for CELP according to the second aspect. A modified controller 810 comprises both functions of the comparer 550*l* and the controller 550*n*. The controller 810 is configured for determining the code gain parameter information $g_c$ and the noise gain parameter information $g_n$ based on analysis by synthesis, i.e. by comparing a synthesized signal with the input signal indicated as s(n) which is, for example, the unvoiced residual. The controller 810 comprises an analysis-by-synthesis filter 820 configured for generating an excitation for the signal generator (innovative excitation) 550*a* and for providing the gain parameter information $g_c$ and $g_n$. The analysis-by-synthesis block 810 is configured to compare the combined excitation signal 550*k*' by a signal internally synthesized by adapting a filter in accordance with the provided parameters and information.

The controller 810 comprises an analysis block configured for obtaining prediction coefficients as it is described for the analyzer 320 to obtain the prediction coefficients 122. The controller further comprises a synthesis filter 840 for filtering the combined excitation signal 550*k* with the synthesis filter 840, wherein the synthesis filter 840 is adapted by the filter coefficients 122. A further comparer may be configured to compare the input signal s(n) and the synthesized signal ŝ(n), e.g., the decoded (restored) audio signal.

Further, the memory 350 *n* is arranged, wherein the controller 810 is configured to store the predicted signal and/or the predicted coefficients in the memory. A signal generator 850 is configured to provide an adaptive excitation signal based on the stored predictions in the memory 350*n* allowing for enhancing adaptive excitation based on a former combined excitation signal.

Figure 9:
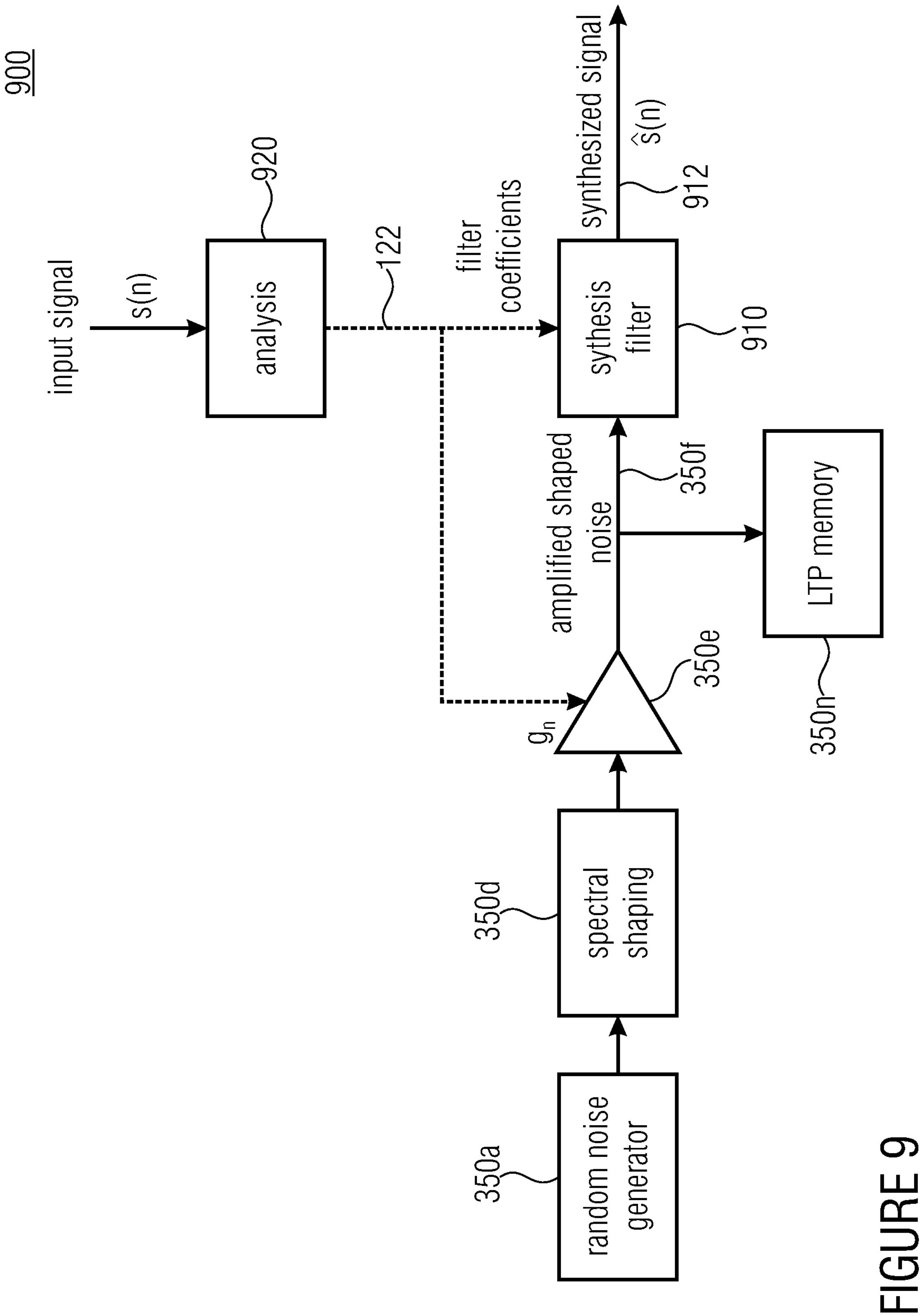
FIG. 9 shows a schematic block diagram of a parametric unvoiced coding according to an embodiment of the first aspect.

FIG. 9 shows a schematic block diagram of a parametric unvoiced coding according to the first aspect. The amplified shaped noise signal may be an input signal of a synthesis filter 910 that is adapted by the determined filter coefficients (prediction coefficients) 122. A synthesized signal 912 output by the synthesis filter may be compared to the input signal s(n) which may be, for example the audio signal. The synthesized signal 912 comprises an error when compared to the input signal s(n). By modifying the noise gain parameter $g_n$ by the analysis block 920 which may correspond to the gain parameter calculator 150 or 350, the error may be reduced or minimized. By storing the amplified shaped noise signal 350*f* in the memory 350*n*, an update of the adaptive codebook may be performed, such that processing of voiced audio frames may also be enhanced based on the improved coding of the unvoiced audio frame.

Figure 10:
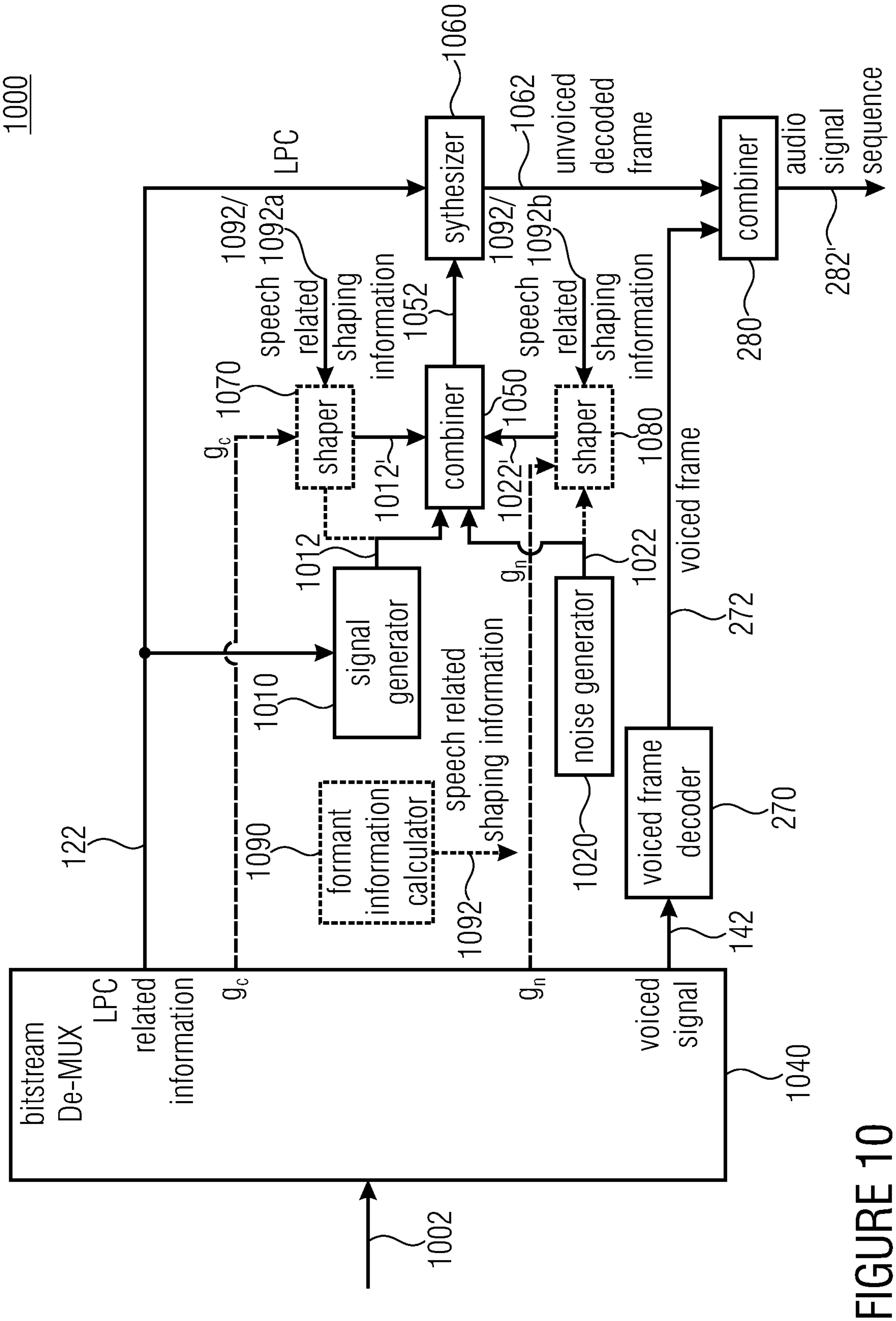
FIG. 10 shows a schematic block diagram of a decoder for decoding an encoded audio signal according to an embodiment of the second aspect.

FIG. 10 shows a schematic block diagram of a decoder 1000 for decoding an encoded audio signal, for example, the encoded audio signal 692. The decoder 1000 comprises a signal generator 1010 and a noise generator 1020 configured for generating a noise-like signal 1022. The received signal 1002 comprises LPC related information, wherein a bitstream deformer 1040 is configured to provide the prediction coefficients 122 based on the prediction coefficient related information. For example, the decoder 1040 is configured to extract the prediction coefficients 122. The signal generator 1010 is configured to generate a code excited excitation signal 1012 as it is described for the signal generator 558. A combiner 1050 of the decoder 1000 is configured for combining the code excited signal 1012 and the noise-like signal 1022 as it is described for the combiner 550 to obtain a combined excitation signal 1052. The decoder 1000 comprises a synthesizer 1060 having a filter for being adapted with the prediction coefficients 122, wherein the synthesizer is configured for filtering the combined excitation signal 1052 with the adapted filter to obtain an unvoiced decoded frame 1062. The decoder 1000 also comprises the combiner 284 combining the unvoiced decoded frame and the voiced frame 272 to obtain the audio signal sequence 282. When compared to the decoder 200, the decoder 1000 comprises a second signal generator configured to provide the code excited excitation signal 1012. The noise-like excitation signal 1022 may be, for example, the noise-like signal n(n) depicted in FIG. 2.

The audio signal sequence 282 may comprise a good quality and a high likeness when compared to an encoded input signal.

Further embodiments provide decoders enhancing the decoder 1000 by shaping and/or amplifying the code-generated (code excited) excitation signal 1012 and/or the noise-like signal 1022. Thus, the decoder 1000 may comprise a shaping processor and/or a variable amplifier arranged between the signal generator 1010 and the combiner 1050, between the noise generator 1020 and the combiner 1050, respectively. The input signal 1002 may comprise information related to the code gain parameter information $g_c$ and/or the noise gain parameter information, wherein the decoder may be configured to adapt an amplifier for amplifying the code generated excitation signal 1012 or a shaped version thereof by using the code gain parameter information $g_c$. Alternatively, or in addition, the decoder 1000 may be configured to adapt, i.e., to control an amplifier for amplifying the noise-like signal 1022 or a shaped version thereof with an amplifier by using the noise gain parameter information.

Alternatively, the decoder 1000 may comprise a shaper 1070 configured for shaping the code excited excitation signal 1012 and/or a shaper 1080 configured for shaping the noise-like signal 1022 as indicated by the dotted lines. The shapers 1070 and/or 1080 may receive the gain parameters $g_c$ and/or $g_n$ and/or speech related shaping information. The shapers 1070 and/or 1080 may be formed as described for the above described shapers 250, 350*c* and/or 550*b*.

The decoder 1000 may comprise a formantic information calculator 1090 to provide a speech related shaping information 1092 for the shapers 1070 and/or 1080 as it was described for the formant information calculator 160. The formant information calculator 1090 *ma* be configured to provide different speech related shaping information (1092*a*; 1092*b*) to the shapers 1070 and/or 1080.

Figure 11A:
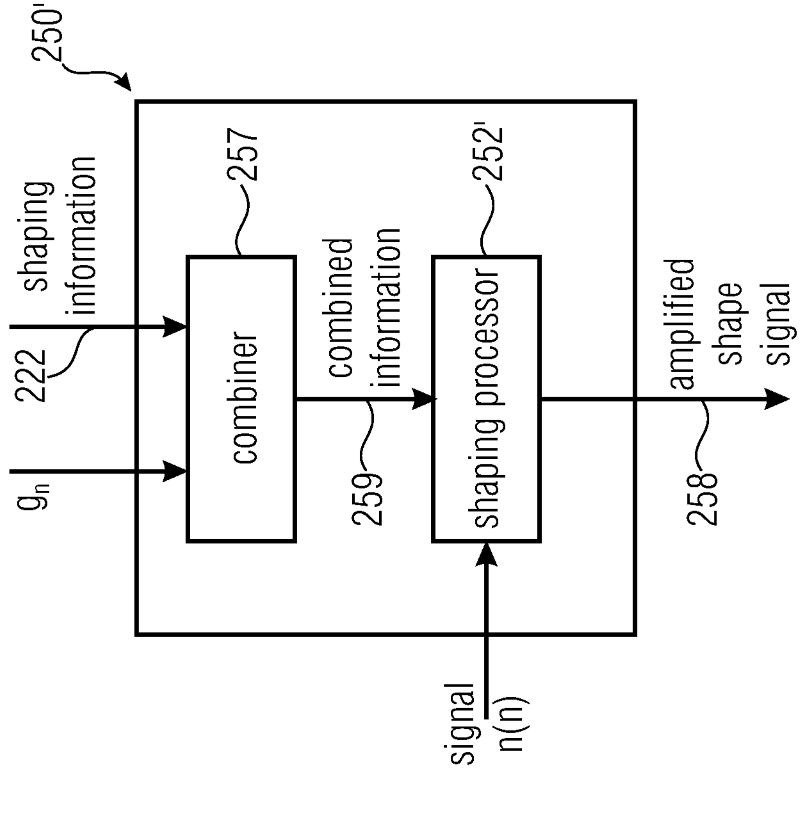
FIG. 11*a* shows a schematic block diagram of a shaper implementing an alternative structure when compared to a shaper shown in FIG. 2 according to an embodiment of the first aspect.

FIG. 11*a* shows a schematic block diagram of a shaper 250' implementing an alternative structure when compared to the shaper 250. The shaper 250' comprises a combiner 257 for combining the shaping information 222 and the noise-related gain parameter $g_n$ to obtain a combined information 259. A modified shaping processor 252' is configured to shape the noise-like signal n(n) by using the combined information 259 to obtain the amplified shaped noise-like signal 258. As both, the shaping information 222 and the gain parameter $g_n$ may be interpreted as multiplication factors, both multiplication factors may be multiplied by using the combiner 257 and then applied in combined form to the noise-like signal n(n).

Figure 11B:
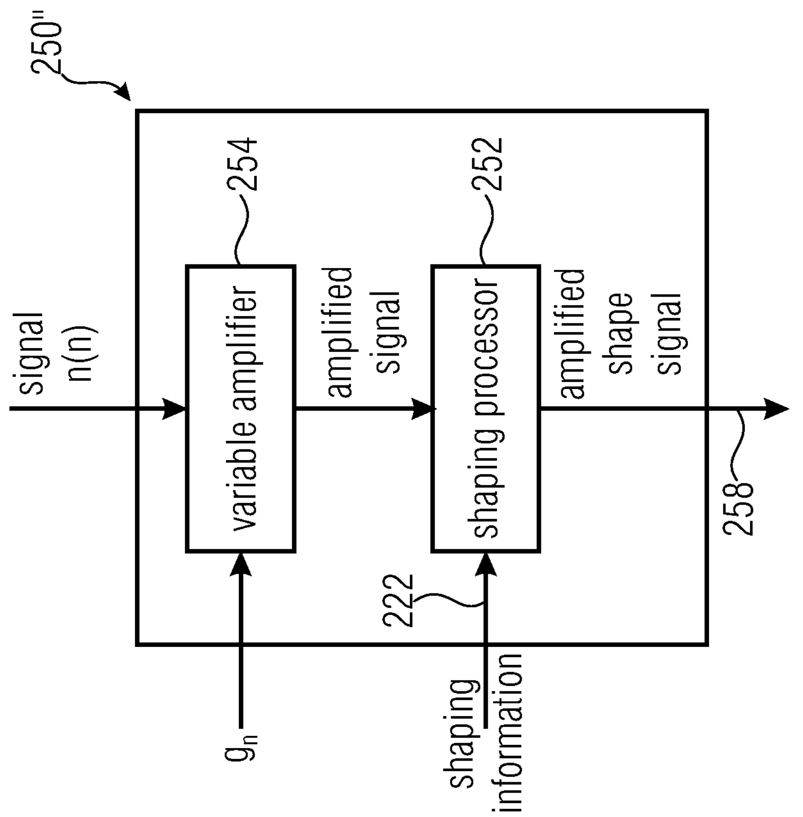
FIG. 11*b* shows a schematic block diagram of a further shaper implementing a further alternative when compared to the shaper shown in FIG. 2 according to an embodiment of the first aspect.

FIG. 11*b* shows a schematic block diagram of a shaper 250" implementing a further alternative when compared to the shaper 250. When compared to the shaper 250, first the variable amplifier 254 is arranged and configured to generate an amplified noise-like signal by amplifying the noise-like signal n(n) using the gain parameter $g_n$. The shaping processor 252 is configured to shape the amplified signal using the shaping information 222 to obtain the amplified shape signal 258.

Although FIGS. 11*a* and 11*b* relate to the shaper 250 depicting alternative implementations, above descriptions also apply to shapers 350*c*, 550*b*, 1070 and/or 1080.

Figure 12:
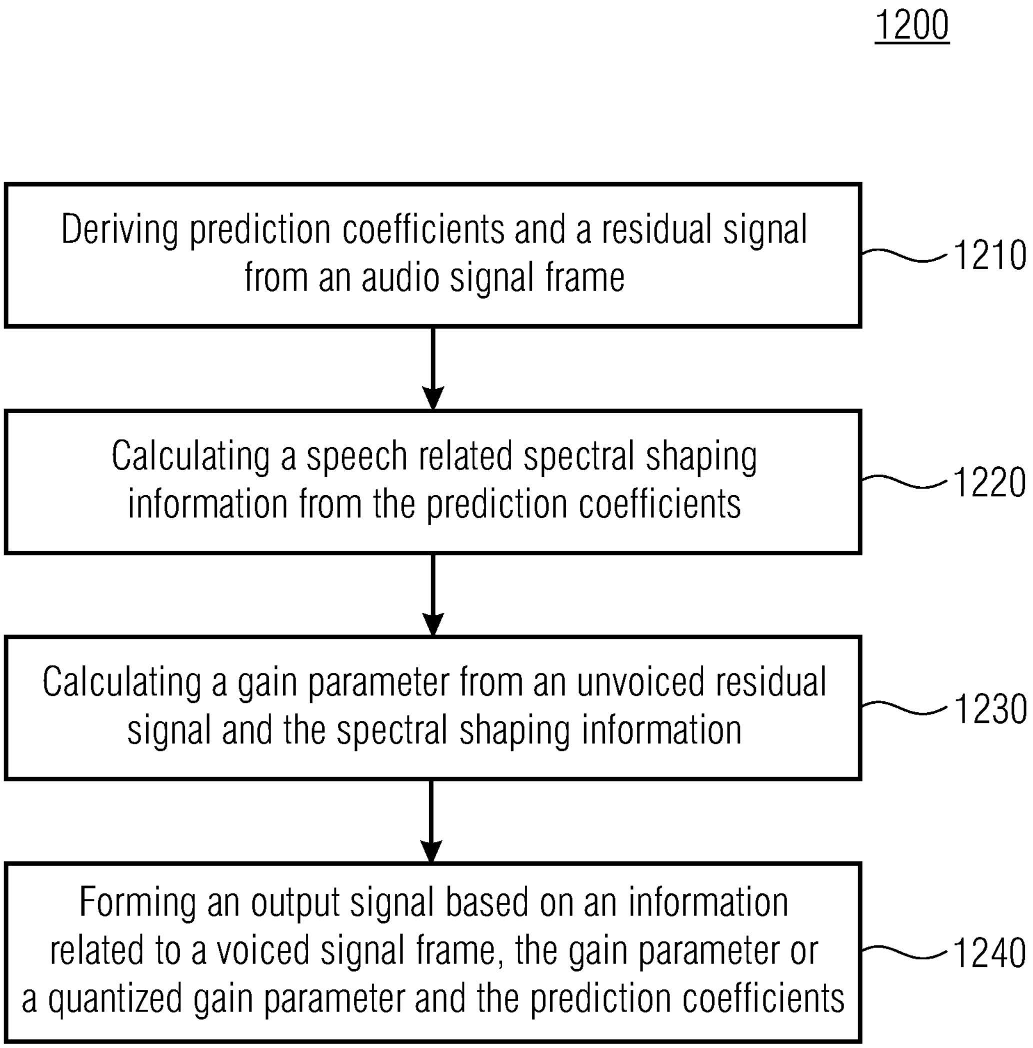
FIG. 12 shows a schematic flowchart of a method for encoding an audio signal according to an embodiment of the first aspect.

FIG. 12 shows a schematic flowchart of a method 1200 for encoding an audio signal according to the first aspect. The method 1210 comprising deriving prediction coefficients and a residual signal from an audio signal frame. The method 1200 comprises a step 1230 in which a gain parameter is calculated from an unvoiced residual signal and the spectral shaping information and a step 1240 in which an output signal is formed based on an information related to a voiced signal frame, the gain parameter or a quantized gain parameter and the prediction coefficients.

Figure 13:
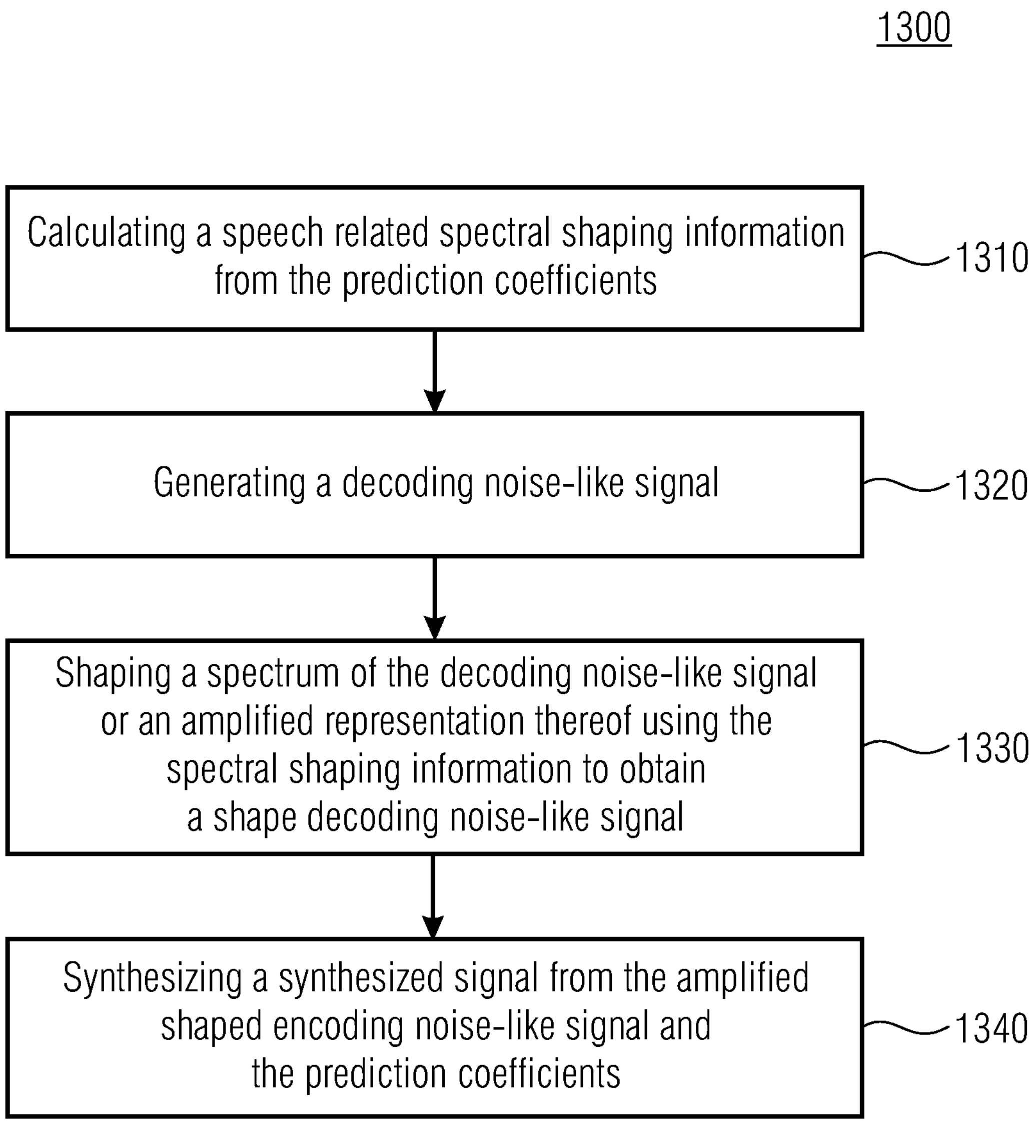
FIG. 13 shows a schematic flowchart of a method for decoding a received audio signal comprising prediction coefficients and a gain parameter, according to an embodiment of the first aspect.

FIG. 13 shows a schematic flowchart of a method 1300 for decoding a received audio signal comprising prediction coefficients and a gain parameter, according to the first aspect. The method 1300 comprises a step 1310 in which a speech related spectral shaping information is calculated from the prediction coefficients. In a step 1320 a decoding noise-like signal is generated. In a step 1330 a spectrum of the decoding noise-like signal or an amplified representation thereof is shaped using the spectral shaping information to obtain a shape decoding noise-like signal. In a step 1340 of method 1300 a synthesized signal is synthesized from the amplified shaped encoding noise-like signal and the prediction coefficients.

Figure 14:
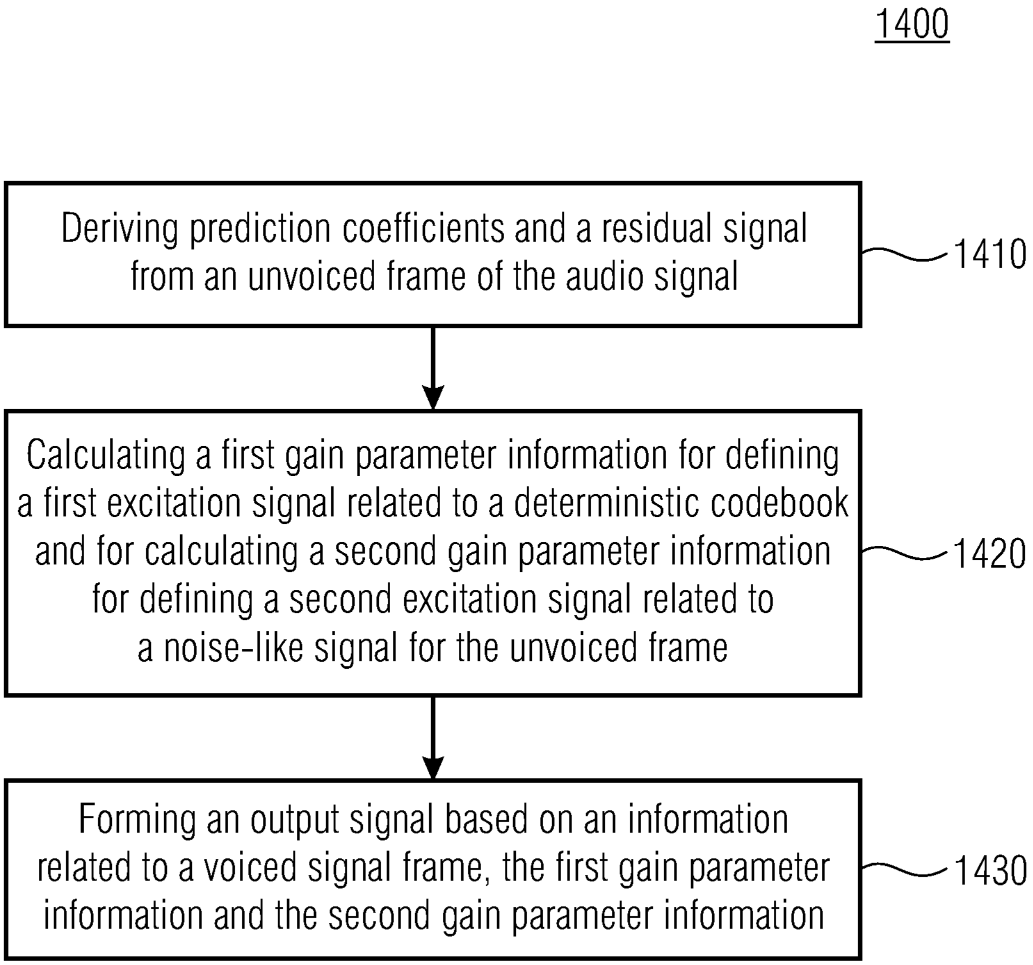
FIG. 14 shows a schematic flowchart of a method for encoding an audio signal according to an embodiment of the second aspect.

FIG. 14 shows a schematic flowchart of a method 1400 for encoding an audio signal according to the second aspect. The method 1400 comprises a step 1410 in which prediction coefficients and a residual signal are derived from an unvoiced frame of the audio signal. In a step 1420 of method 1400 a first gain parameter information for defining a first excitation signal related to a deterministic codebook and a second gain parameter information for defining a second excitation signal related to a noise-like signal are calculated for the unvoiced frame.

In a step 1430 of method 1400 an output signal is formed based on an information related to a voiced signal frame, the first gain parameter information and the second gain parameter information.

Figure 15:
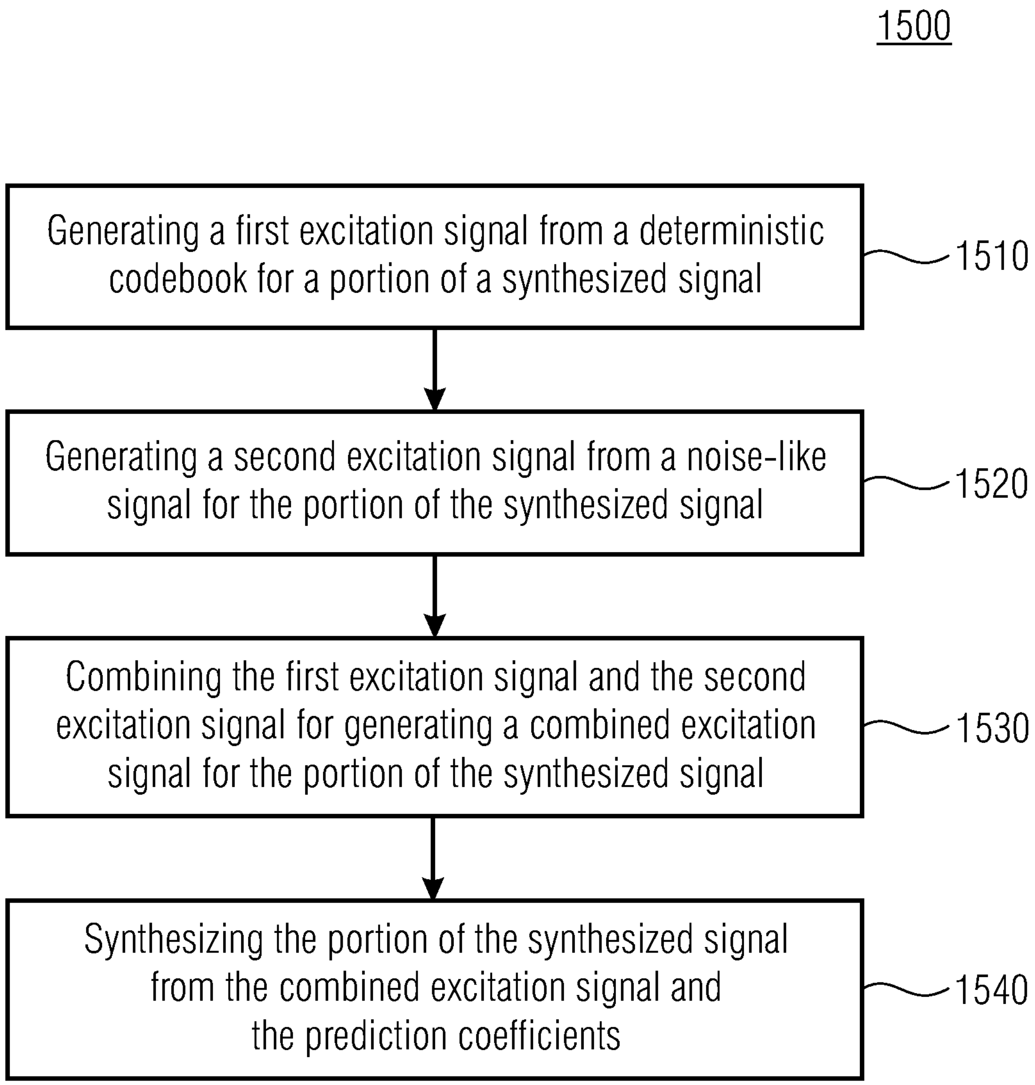
FIG. 15 shows a schematic flowchart of a method for decoding a received audio signal according to an embodiment of the second aspect.
Figure 16:
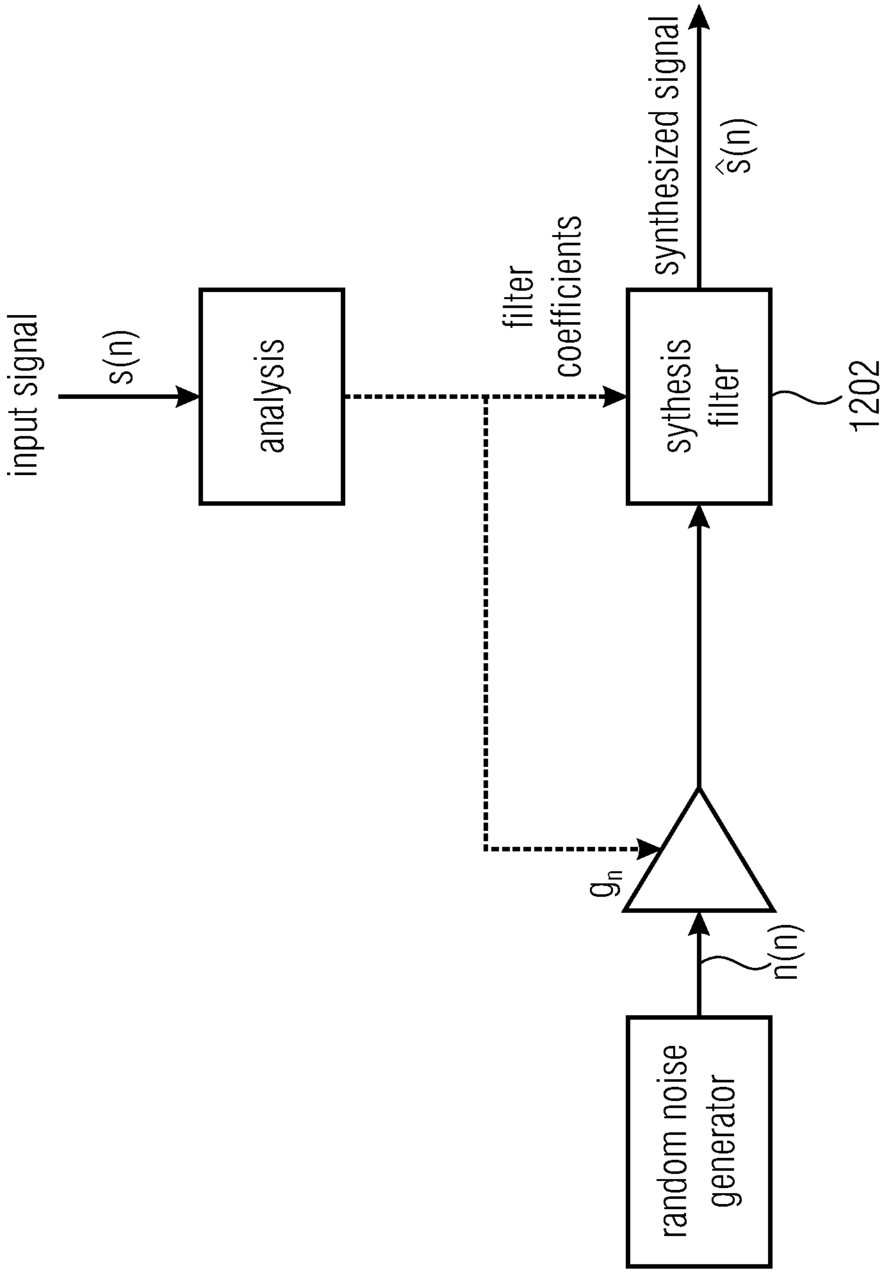
FIG. 16 shows a schematic block diagram of a parametric unvoiced coding scheme.

FIG. 15 shows a schematic flowchart of a method 1500 for decoding a received audio signal according to the second aspect. The received audio signal comprises an information related to prediction coefficients. The method 1500 comprises a step 1510 in which a first excitation signal is generated from a deterministic codebook for a portion of a synthesized signal. In a step 1520 of method 1500 a second excitation signal is generated from a noise-like signal for the portion of the synthesized signal. In a step 1530 of method 1000 the first excitation signal and the second excitation signal are combined for generating a combined excitation signal for the portion of the synthesized signal. In a step 1540 of method 1500 the portion of the synthesized signal is synthesized from the combined excitation signal and the prediction coefficients.

In other words, aspects of the present invention propose a new way of coding the unvoiced frames by means of shaping a randomly generated Gaussian noise and shaped it spectrally by adding to it a formantic structure and a spectral tilt. The spectral shaping is done in the excitation domain before exciting the synthesis filter. As a consequence, the shaped excitation will be updated in the memory of the long-term prediction for generating subsequent adaptive codebooks.

The subsequent frames, which are not unvoiced, will also benefit from the spectral shaping. Unlike the formant enhancement in the post-filtering, the proposed noise shaping is performed at both encoder and decoder sides.

Such an excitation can be used directly in a parametric coding scheme for targeting very low bitrates. However, we propose also to associate such an excitation in combination with a conventional innovative codebook within a CELP coding scheme.

For the both methods, we propose a new gain coding especially efficient for both clean speech and speech with background noise. We propose some mechanisms to get as close as possible to the original energy but at the same time avoiding too harsh transitions with non-unvoiced frames and also avoiding unwanted instabilities due to the gain quantization.

The first aspect targets unvoiced coding with a rate of 2.8 and 4 kilobits per second (kbps). The unvoiced frames are first detected. It can be done by a usually speech classification as it is done in Variable Rate Multimode Wideband (VMR-WB) as it is known from [3].

There are two main advantages doing the spectral shaping at this stage. First, the spectral shaping is taking into account for the gain calculation of the excitation. As the gain computation is the only non-blind module during the excitation generation, it is a great advantage to have it at the end of the chain after the shaping. Secondly it allows saving the enhanced excitation in the memory of LTP. The enhancement will then also serve subsequent non-unvoiced frames.

Although the quantizers 170, 170-1 and 170-2 where described as being configured for obtaining the quantized parameters $\hat{g}_c$ and $\hat{g}_n$, the quantized parameters may be provided as an information related thereto, e.g., an index or an identifier of an entry of a database, the entry comprising the quantized gain parameters $\hat{g}_c$ and $\hat{g}_n$.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] Recommendation ITU-T G.718: "Frame error robust narrow-band and wideband embedded variable bit-rate coding of speech and audio from 8-32 kbit/s"

[2] U.S. Pat. No. 5,444,816, "Dynamic codebook for efficient speech coding based on algebraic codes"

[3] Jelinek, M.; Salami, R., "Wideband Speech Coding Advances in VMR-WB Standard," Audio, Speech, and Language Processing, IEEE Transactions on, vol. 15, no. 4, pp. 1167, 1179, May 2007

The invention claimed is:

1. An encoder for encoding an audio signal, the encoder comprising an analyzer configured for deriving prediction coefficients and a residual signal from a frame of the audio signal;

a formant information calculator configured for calculating a speech related spectral shaping information from the prediction coefficients;

a gain parameter calculator configured for calculating a gain parameter from an unvoiced residual signal and the spectral shaping information; and a bitstream former configured for forming an output signal based on an information related to a voiced signal frame, the gain parameter or a quantized gain parameter and the prediction coefficients;

a shaper configured for amplifying and shaping a spectrum of the encoding noise-like signal using the speech related spectral shaping information and the gain parameter as temporary gain parameter to acquire an amplified shaped encoding noise-like signal;

wherein the shaper is configured for combining a spectrum of the encoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value.

2. The encoder according to claim 1, further comprising a decider configured for determining if the residual signal was determined from an unvoiced signal audio frame.

3. The encoder according to claim 1, wherein the gain parameter calculator comprises:

a noise generator configured for generating an encoding noise-like signal;

a comparer configured for comparing the unvoiced residual signal and the amplified shaped encoding noise-like signal to acquire a measure for a likeness between the unvoiced residual signal and the amplified shaped encoding noise-like signal; and a controller configured for determining the gain parameter and to adapt the temporary gain parameter based on the comparison result;

wherein the controller is configured to provide the encoding gain parameter to the bitstream former, when a value of the measure for the likeness is above a threshold value.

4. The encoder according to claim 1, wherein the gain parameter calculator comprises:

a noise generator configured for generating an encoding noise-like signal;

a synthesizer configured for synthesizing a synthesized signal from the amplified shaped encoding noise-like signal and the prediction coefficients and to provide the synthesized signal;

a comparer configured for comparing the audio signal and the synthesized signal to acquire a measure for a likeness between the audio signal and the synthesized signal; and a controller configured for determining the gain parameter and to adapt the temporary gain parameter based on the comparison result;

wherein the controller is configured to provide the encoding gain parameter to the bitstream former, when a value of the measure for the likeness is above a threshold value.

5. The encoder according to claim 4, further comprising a gain memory configured for recording an encoding information comprising the encoding gain parameter or an information related thereto, wherein the controller is configured to record the encoding information during processing of the audio frame and for determining the gain parameter for a subsequent frame of the audio signal based on the encoding information of the preceding frame of the audio signal.

6. The encoder according to claim 3, wherein the noise generator is configured for generating a plurality of random signals and to combine the plurality of random signals to acquire the encoding noise-like signal.

7. The encoder according to claim 1, further comprising a quantizer configured for receiving the gain parameter, for quantizing the gain parameter to acquire the quantized gain parameter.

8. The encoder according to claim 1, wherein the shaper is configured for combining a spectrum of the encoding noise-like signal or a spectrum derived thereof and a transfer function comprising $$Ffe(z) = \frac{A(z/w1)}{A(z/w2)}$$

wherein A(z) corresponds to a filter polynomial of the encoding filter for filtering the adapted shaped encoding noise-like signal weighted by weighting factors w1 or w2, wherein w1 comprises a positive non zero scalar value of at most 1.0 and wherein w2 comprises a positive non zero scalar value of at most 1.00, wherein w2 is greater than w1.

9. A decoder for decoding a received signal comprising information related to prediction coefficients, the decoder comprising a formant information calculator configured for calculating a speech related spectral shaping information from the prediction coefficients;

a noise generator configured for generating a decoding noise-like signal;

a shaper configured for shaping a spectrum of the decoding noise-like signal or an amplified representation thereof using the spectral shaping information to acquire a shaped decoding noise-like signal; and a synthesizer configured for synthesizing a synthesized signal from the amplified shaped encoding noise-like signal and the prediction coefficients;

wherein the shaper is configured for combining a spectrum of the decoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value.

10. The decoder according to claim 9, wherein the received signal comprises an information related to a gain parameter and wherein the shaper comprises an amplifier configured for amplifying the decoding noise-like signal or the shaped decoding noise-like signal.

11. The decoder according to claim 9, wherein the received signal further comprises a voiced information related to a voiced frame of an encoded audio signal and wherein the decoder further comprises a voiced frame processor configured for determining a voiced signal based on the voiced information, wherein the decoder further comprises a combiner configured for combining the synthesized signal and the voiced signal to acquire a frame of an audio signal sequence.

12. A method for encoding an audio signal, comprising deriving prediction coefficients and a residual signal from an audio signal frame;

calculating a speech related spectral shaping information from the prediction coefficients;

calculating a gain parameter from an unvoiced residual signal and the spectral shaping information; and forming an output signal based on an information related to a voiced signal frame, the gain parameter or a quantized gain parameter and the prediction coefficients;

amplifying and shaping a spectrum of the encoding noise-like signal using the speech related spectral shaping information and the gain parameter as temporary gain parameter to acquire an amplified shaped encoding noise-like signal;

such that for combining a spectrum of the encoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value.

13. A method for decoding a received audio signal comprising an information related prediction coefficients and a gain parameter, the method comprising calculating a speech related spectral shaping information from the prediction coefficients;

generating a decoding noise-like signal;

shaping a spectrum of the decoding noise-like signal or an amplified representation thereof using the spectral shaping information to acquire a shaped decoding noise-like signal; and synthesizing a synthesized signal from the amplified shaped encoding noise-like signal and the prediction coefficients;

combining a spectrum of the decoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value.

14. A non-transitory digital storage medium having stored thereon a computer program for performing a method for encoding an audio signal, comprising deriving prediction coefficients and a residual signal from an audio signal frame;

calculating a speech related spectral shaping information from the prediction coefficients;

calculating a gain parameter from an unvoiced residual signal and the spectral shaping information; and forming an output signal based on an information related to a voiced signal frame, the gain parameter or a quantized gain parameter and the prediction coefficients, amplifying and shaping a spectrum of the encoding noise-like signal using the speech related spectral shaping information and the gain parameter as temporary gain parameter to acquire an amplified shaped encoding noise-like signal;

such that for combining a spectrum of the encoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value, when said computer program is run by a computer.

15. A non-transitory digital storage medium having stored thereon a computer program for performing a method for decoding a received audio signal comprising an information related prediction coefficients and a gain parameter, the method comprising calculating a speech related spectral shaping information from the prediction coefficients;

generating a decoding noise-like signal;

shaping a spectrum of the decoding noise-like signal or an amplified representation thereof using the spectral shaping information to acquire a shaped decoding noise-like signal; and synthesizing a synthesized signal from the amplified shaped encoding noise-like signal and the prediction coefficients, combining a spectrum of the decoding noise-like signal or a spectrum derived thereof with a transfer function comprising $$Ft(z)=1-\beta z^{-1}$$

wherein z indicates a representation in the z-domain, wherein β represents a measure (voicing) for a voicing determined by relating an energy of a past frame of the audio signal and an energy of a present frame of the audio signal, wherein the measure β is determined in function of a voicing value, when said computer program is run by a computer.

* * * * *